(12) United States Patent
Liu

(10) Patent No.: US 10,506,223 B2
(45) Date of Patent: Dec. 10, 2019

(54) METHOD, APPARATUS, AND DEVICE FOR REALIZING VIRTUAL STEREOSCOPIC SCENE

(71) Applicant: SUPERD TECHNOLOGY CO., LTD., Shenzhen (CN)

(72) Inventor: Jiang Liu, Shenzhen (CN)

(73) Assignee: SUPERD TECHNOLOGY CO., LTD., Shenzhen (CN)

( * ) Notice: Subject to any disclaimer, the term of this patent is extended or adjusted under 35 U.S.C. 154(b) by 551 days.

(21) Appl. No.: 15/246,016

(22) Filed: Aug. 24, 2016

(65) Prior Publication Data
US 2017/0359571 A1 Dec. 14, 2017

(30) Foreign Application Priority Data
Jun. 12, 2016 (CN) .......................... 2016 1 0410771

(51) Int. Cl.
*H04N 13/383* (2018.01)
*H04N 13/117* (2018.01)
(Continued)

(52) U.S. Cl.
CPC ......... *H04N 13/383* (2018.05); *G06T 19/006* (2013.01); *H04N 13/117* (2018.05);
(Continued)

(58) Field of Classification Search
USPC .......................................................... 348/47
See application file for complete search history.

(56) References Cited

U.S. PATENT DOCUMENTS 8,581,905 B2 * 11/2013 Mitchell ................. G06T 15/20
345/427
2004/0004584 A1 1/2004 Hebert
(Continued)

FOREIGN PATENT DOCUMENTS

CN 1262743 A 8/2000
CN 101285936 A 10/2008
CN 104570356 A 4/2015

*Primary Examiner* — Christopher S Kelley
*Assistant Examiner* — Ana Picon-Feliciano
(74) *Attorney, Agent, or Firm* — Anova Law Group, PLLC

(57) ABSTRACT

A method and a system for realizing a virtual stereoscopic scene based on mapping are provided. The method comprises, acquiring a distance between an observer's two eyes E_R, a maximum convex displaying distance of a real screen N_R, a distance from the observer's eyes to the real screen Z_R, and a maximum concave displaying distance of the real screen F_R; calculating a parallax $d_{N\_R}$ at N_R, and a parallax $d_{F\_R}$ at F_R; acquiring a distance between a virtual single camera and a virtual near clipping plane N_V, and a distance between a virtual single camera and a virtual far clipping plane F_V; calculating a distance E_V between a left virtual camera and a right virtual camera, and asymmetric perspective projection parameters of the left virtual camera and the right virtual camera; performing a perspective projection transformation of scene content of the virtual single camera, and displaying a virtual stereoscopic scene.

20 Claims, 6 Drawing Sheets

(51) Int. Cl.
*H04N 13/128* (2018.01)
*H04N 13/344* (2018.01)
*H04N 13/398* (2018.01)
*G06T 19/00* (2011.01)

(52) U.S. Cl.
CPC ......... *H04N 13/128* (2018.05); *H04N 13/344* (2018.05); *H04N 13/398* (2018.05)

(56) References Cited

U.S. PATENT DOCUMENTS

2014/0036038 A1* 2/2014 McNally ............... G06T 19/006
  348/47
2014/0327613 A1* 11/2014 Chessa ............... H04N 13/0014
  345/156
2016/0337640 A1* 11/2016 Ma ........................... G06T 7/60

\* cited by examiner

METHOD, APPARATUS, AND DEVICE FOR REALIZING VIRTUAL STEREOSCOPIC SCENE

CROSS-REFERENCES TO RELATED APPLICATIONS

This application claims priority of Chinese Application No. CN201610410771.7, filed on Jun. 12, 2016, the entire contents of which are hereby incorporated by reference.

FIELD OF THE INVENTION

The present disclosure generally relates to the field of image processing technologies and, more particularly, relates to method, apparatus and device for realizing virtual stereoscopic scene.

BACKGROUND

Virtual Reality (VR), also known as immersive multimedia or computer-simulated reality, is a computer technology that replicates an environment, real or imagined, and simulates a user's physical presence and environment to allow for user interaction. That is, a VR operation comprehensively unitizes Computer Graphics systems, physical presence, and interface equipment (e.g., controllers) to provide immersive user experience in a computer-generated three-dimensional (3D) interactive environment. For users, visual perception is a foundation of realistic and immersive experience and, thus, currently most VR applications and stereoscopic applications are committed to the development of stereoscopic display of the virtual scene.

Virtual scenes can be created by computers via Open Graphics Library (OpenGL) and other graphics engines, and presented in a real scene through a display. That is, the virtual scenes are displayed by the display. Virtual scenes can also be created through capturing images of physical objects. The real scene is referred to a user's observation space, and a user in a fixed position of the real scene is able to observe the virtual scene displayed by the display, i.e., the virtual scene is observed by the user's eyes.

To achieve a stereoscopic display of the virtual scene created by graphics engines, Computer Graphics systems are adopted to convert the virtual scene to a virtual stereoscopic scene, such that the virtual stereoscopic scene can be displayed in the real scene. In existing technologies, fixed linear conversion parameters are often adopted to convent the virtual scene to the virtual stereoscopic scene. However, such a linear conversion method may result a poor fusion of the virtual scene and the real observation space (i.e., real scene), and the corresponding 3D effect may also be poor.

To achieve a stereoscopic display of the virtual scene created by capturing images of physical objects, stereoscopic images of the physical objects are often captured by dual cameras, and the corresponding virtual stereoscopic scenes are restored based on the stereoscopic images of the physical objects. However, due to subjectivity and randomness of the dual cameras, a fusion of the virtual scene and the real observation space (i.e., real scene) may be poor, and the corresponding 3D effect may also be poor. It may be very time consuming to try various approaches to realize a better fusion of the virtual scene and the real observation space, as well as, a better 3D effect, which may not be applicable to high-volume and high-efficiency industry output.

Thus, how to find a method to rapidly convert a virtual scene to a virtual stereoscopic scene and to display the virtual stereoscopic scene in a real scene, featured with a desired fusion of the virtual scenes and the real scene and a desired 3D effect, now becomes an urgent problem to be solved.

The disclosed method, apparatus and device are directed to solve one or more problems set forth above and other problems in the art.

BRIEF SUMMARY OF THE DISCLOSURE

One aspect of the present disclosure provides a method for realizing a virtual stereoscopic scene based on mapping. The method comprises in a real scene, acquiring a distance between an observer's two eyes E_R, a maximum convex displaying distance of a real screen N_R, a distance from the observer's eyes to the real screen Z_R, and a maximum concave displaying distance of the real screen F_R; based on the obtained E_R, N_R, Z_R and F_R, calculating a parallax $d_{N\_R}$ in the real scene at the distance N_R, and a parallax $d_{F\_R}$ in the real scene at the distance F_R; in a virtual scene, acquiring a distance between a virtual single camera and a virtual near clipping plane N_V, and a distance between a virtual single camera and a virtual far clipping plane F_V; provided that a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, based on the parallax $d_{N\_V}$, $d_{F\_V}$, and the distance N_V and F_V, calculating a distance E_V between a left virtual camera and a right virtual camera, and asymmetric perspective projection parameters of the left virtual camera and the right virtual camera; based on the distance E_V and the virtual single camera, obtaining the left virtual camera and the right virtual camera; and based on the left virtual camera, the right virtual camera, and the asymmetric perspective projection parameters of the right and left virtual cameras, performing a perspective projection transformation of scene content of the virtual single camera, creating and displaying a virtual stereoscopic scene corresponding to the virtual scene, such that a mapping between the virtual scene and the real scene is generated.

Another aspect of the present disclosure provides a system for realizing a virtual stereoscopic scene based on mapping. The system comprises an acquisition module configured to, in a real scene, acquire a distance between an observer's two eyes E_R, a maximum convex displaying distance of a real screen N_R, a distance from the observer's eyes to the real screen Z_R, and a maximum concave displaying distance of the real screen F_R, and configured to, in a virtual scene, acquire a distance between a virtual single camera and a virtual near clipping plane N_V, and a distance between a virtual single camera and a virtual far clipping plane F_V; a process module configured to, based on the obtained E_R, N_R, Z_R and F_R, calculating a parallax $d_{N\_R}$ in the real scene at the distance N_R, and a parallax $d_{F\_R}$ in the real scene at the distance F_R, and provided that a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, based on the parallax $d_{N\_V}$, $d_{F\_V}$, and the distance N_V and F_V, configured to calculate a distance E_V between a left virtual camera and a right virtual camera, and asymmetric perspective projection parameters of the left virtual camera and the right virtual camera; and a projection transformation module configured to, based on the distance E_V and the virtual single camera, obtain the left virtual camera and the right virtual camera, and based on the left virtual camera, the right virtual camera, and the asymmetric perspective projection parameters of the right and left virtual cameras, configured to perform a perspective projection transformation of scene content of the virtual single camera, create and display a virtual stereoscopic scene corresponding to the virtual scene, such that a mapping between the virtual scene and the real scene is generated.

Another aspect of the present disclosure provides a system for realizing a virtual stereoscopic scene based on mapping. The system comprises a single camera, a parameter collector, and a smart terminal. The single camera and the parameter collector are connected to the smart terminal, respectively. The parameter collector is configured to in a real scene, collect a distance between an observer's two eyes E_R, a maximum convex displaying distance of a real screen N_R, a distance from the observer's eyes to the real screen Z_R, and a maximum concave displaying distance of the real screen F_R, and in a virtual scene, collect a distance between a virtual single camera and a virtual near clipping plane N_V, and a distance between a virtual single camera and a virtual far clipping plane F_V. The single camera is configured to capture sense content going to have a perspective projection transformation. The smart terminal is configured to, acquire corresponding parameters for the perspective projection transformation of the sense content captured by the single camera, wherein the corresponding parameters include the distance E_R, N_R, Z_R and F_R, based on the distance E_R, N_R, Z_R and F_R, calculate a parallax $d_{N\_R}$ in the real scene at the distance N_R, and a parallax $d_{F\_R}$ in the real scene at the distance F_R, and based on a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, transform the scene content captured by the single camera into scene content of a left virtual camera and scene content of a right virtual camera in the virtual scene.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

Figure 1:
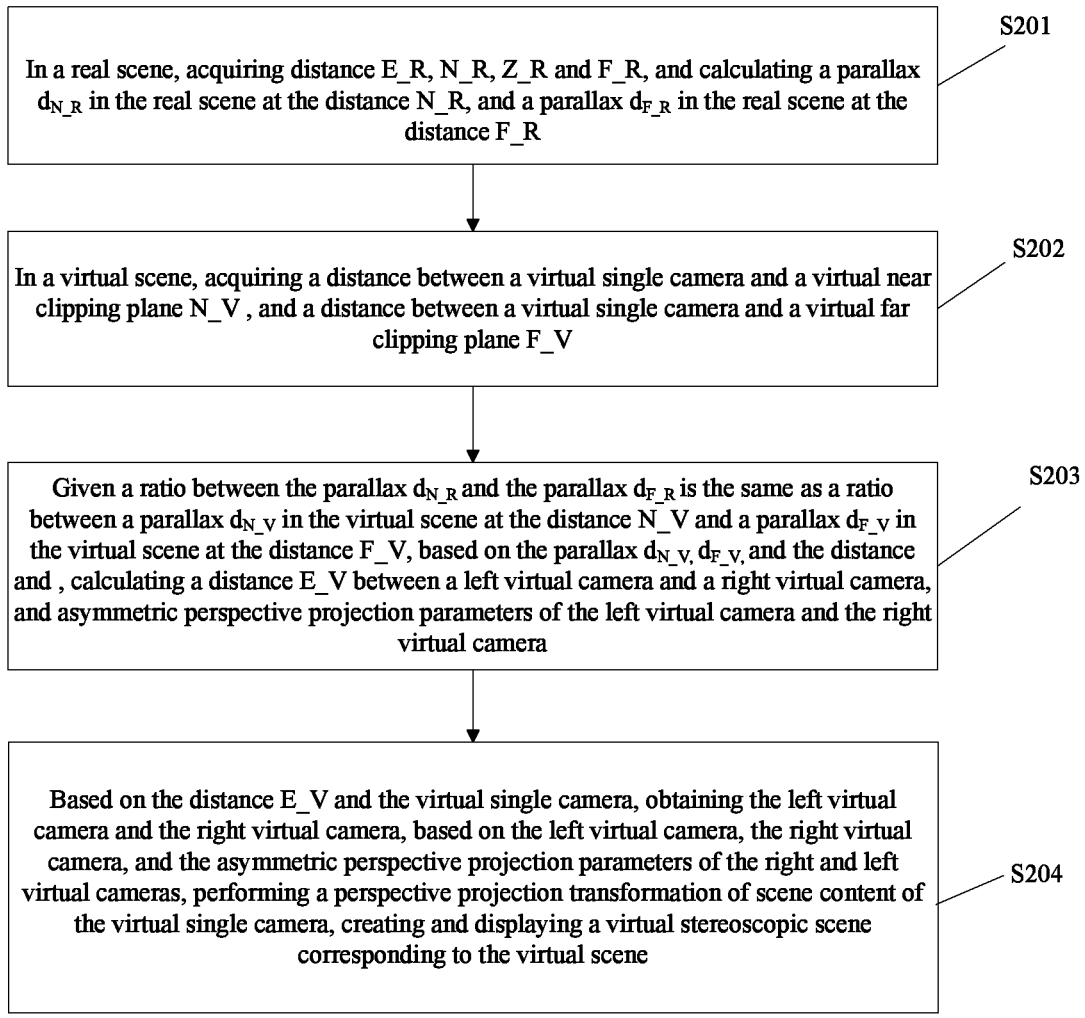
FIG. 1 illustrates a flow chart of an exemplary method for realizing a virtual stereoscopic scene based on mapping consistent with disclosed embodiments.

Reference will now be made in detail to exemplary embodiments of the invention, which are illustrated in the accompanying drawings. Hereinafter, embodiments consistent with the disclosure will be described with reference to drawings. It is apparent that the described embodiments are some but not all of the embodiments of the present invention. Based on the disclosed embodiments, persons of ordinary skill in the art may derive other embodiments consistent with the present disclosure, all of which are within the scope of the present invention. Further, when no conflict exists, the exemplary features illustrated in various embodiments may be combined and/or rearranged. When no conflict exists, the exemplary features illustrated in various embodiments may be combined and/or rearranged.

To perceive a 3D perception of a physical object, an observer's left eye and right eye receive a left image and a right image of the physical object, respectively. The left image and the right image have a parallax between them, based on which depth information is generated when the observer's brain fuses the left image and the right image, and the 3D perception of the physical object is perceived by the observer, accordingly.

To perceive a 3D perception of a 3D model in a virtual scene (i.e., a virtual 3D model), stereoscopic display of the 3D model or the virtual scene is often desired. Stereoscopic display of the 3D model generates a stereoscopic image of the 3D model based on a transformation process of Computer Graphics, and further display the stereoscopic image on a real display. The stereoscopic image of the 3D model may include a left image and a right image. When the displayed stereoscopic image is observed by the observer's eyes, the observer's brain fuses the left image and the right image, and provide corresponding 3D depth information.

In the disclosed embodiments, a process of converting a 3D model in a virtual scene to 3D depth information in a real scene is referred to a mapping process from virtuality to reality.

First, certain terms or definitions used in the present disclosure are explained. A real scene may be referred to an observer's real observation space (i.e., a space observed by human eyes). Based on the observer's cognition and experience, the observe may be able to obtain depth and size information of a physical object in the real scene. The real scene (i.e., real observation space) may be measured in length. For example, when the real scene observed by the observer is a display, an "observer—display space" may be formed, and a distance between the observer and an observation plane (i.e., the display) may be 0.5 m.

A virtual scene may be referred to a "camera—scene space" created by computers utilizing OpenGL graphics engines or the like. The virtual scene may be measured in pixels, i.e., the virtual scene may have a unit of pixels. The virtual scene may be presented by rendering pipelines and displays.

That is, the virtual scene may be displayed by a display in the real scene, and the observer located in a fixed position of the real scene may receive the virtual scene displayed on the display in the real scene. The virtual scene may be measured in pixels, while the real scene may be measured in length, for example, with a unit of meter.

The disclosed method and apparatus for realizing virtual stereoscopic scenes based on a mapping may be applied to autostereoscopic displays, virtual reality (VR) displays, and augmented reality (AR) displays, etc.

FIG. 1 illustrates a flow chart of an exemplary method for realizing a virtual stereoscopic scene based on mapping consistent with disclosed embodiments. The terms of virtual single camera, left/right virtual camera, zero parallax plane, near clipping plane, far clipping plane involved in the disclosed embodiments are known in Computer Graphics and, thus, are not explained here.

As shown in FIG. 1, at the beginning, in a real scene, a distance between an observer's two eyes (denoted as E_R), a maximum convex displaying distance of a real screen (denoted as N_R), a distance from the observer's eyes to the real screen (denoted as Z_R), and a maximum concave displaying distance of the real screen (denoted as F_R) are obtained, and based on the obtained distance E_R, N_R, Z_R and F_R, a parallax in the real scene at the distance N_R (denoted as $d_{N\_R}$), and a parallax in the real scene at the distance F_R (denoted as $d_{F\_R}$) are calculated, respectively (S201).

The maximum convex displaying distance of the real screen N_R and the maximum concave displaying distance of the real screen F_R may indicate a display capability of a stereoscopic display in the real scene, i.e., a depth range of a stereoscopic scene presented by the stereoscopic display or a depth of field of the stereoscopic display. In other words, the depth range of the stereoscopic scene presented by the stereoscopic display may be within a range confined by the maximum convex displaying distance and the maximum concave displaying distance. The maximum convex part of the stereoscopic scene may not be beyond the maximum convex displaying distance, and the maximum concave part of the stereoscopic scene (may not be beyond the maximum concave displaying distance. The real screen may be considered as a zero parallax plane of the real scene.

Figure 2:
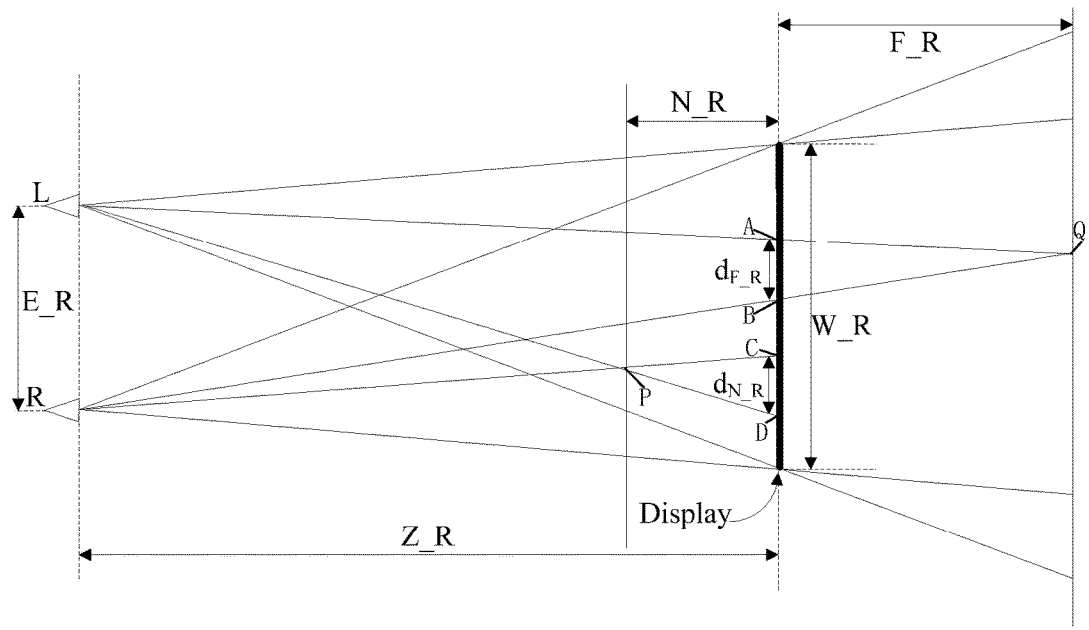
FIG. 2 illustrates an exemplary display optical path in an exemplary real scene consistent with disclosed embodiments.

FIG. 2 illustrates an exemplary optical path in an exemplary real scene consistent with disclosed embodiments. As shown in FIG. 2, in the real scene, a distance between a left eye L and a right eye R of an observer in the real scene is E_R, a width of the real screen is W_R, a maximum convex displaying distance of the real screen is N_R, a distance from the observer's eyes to the real screen is Z_R, a maximum concave displaying distance of the real screen is F_R, a parallax in the real scene at the distance N_R is $d_{N\_R}$, and a parallax in the real scene at the distance F_R is $d_{F\_R}$. The distance from the observer's left eye to the real screen may be equal to distance from the observer's right eye to the real screen, both of which may be called as a distance from the observer's eyes to the real screen.

In particular, the distance E_R, N_R, Z_R and F_R may be predetermined, for example, the distance between two eyes of the observer E_R is approximately 65 mm. When the real scene is a laptop, the distance between the observer who is using the laptop and the screen of the laptop is approximately 50 cm, i.e., Z_R=50 cm. The real screen may be considered as a zero parallax plane of the real scene.

In one embodiment, as shown in FIG. 2, the parallax in the real scene at the distance N_R (denoted as $d_{N\_R}$) and the parallax in the real scene at the distance F_R (denoted as $d_{F\_R}$) may be calculated based on a principle that the ratios of the lengths of their corresponding sides are equal when two figures are similar. Because the triangle CDP and the triangle RLP are similar, CD/RL=height of the triangle CDP/height of the triangle RLP. Introducing corresponding parameters, $$\frac{d_{N\_R}}{E\_R} = \frac{N\_R}{Z\_R - N\_R}$$

is obtained, and $$d_{N\_R} = \frac{N\_R * E\_R}{Z\_R - N\_R}$$

is obtained accordingly. Similarly, because the triangle ABQ and the triangle LRQ are similar, AB/LR=height of the triangle ABQ/height of the triangle LRQ. Introducing corresponding parameters, $$\frac{d_{F\_R}}{E\_R} = \frac{F\_R}{F\_R + Z\_R}$$

is obtained, and $$d_{F\_R} = \frac{F\_R * E\_R}{Z\_R + F\_R}$$

is obtained accordingly. Then, based on the obtained distance E_R, N_R, Z_R and F_R, $d_{N\_R}$ and $d_{F\_R}$ may be calculated respectively.

Returning to FIG. 1, after the various distances are obtained, in the virtual scene, a distance between a virtual single camera and a virtual near clipping plane (denoted as N_V), and a distance between a virtual single camera and a virtual far clipping plane (denoted as F_V) are obtained (S202). The distance N_V and F_V may be predetermined. In particular, the steps S201 and S202 may be performed in no particular order. That is, one of the steps S201 and S202 may be performed first and the other may be performed later, or both steps S201 and S202 may be performed simultaneously.

After the distance N_V and F_V are obtained, provided that a ratio between the parallax $d_{N\_R}$ and the parallax $d_{F\_R}$ is the same as a ratio between a parallax in the virtual scene at the distance N_V (denoted as $d_{N\_V}$) and a parallax in the virtual scene at the distance F_V (denoted as $d_{F\_V}$), i.e., $d_{N\_R}/d_{F\_R}=d_{N\_V}/d_{F\_V}$, based on the parallax $d_{N\_V}$, $d_{F\_V}$, and the distance N_V and F_V, a distance between a left virtual camera and a right virtual camera (denoted as E_V), as well as, asymmetric perspective projection parameters of the left virtual camera and the right virtual camera are obtained (S203).

Figure 3:
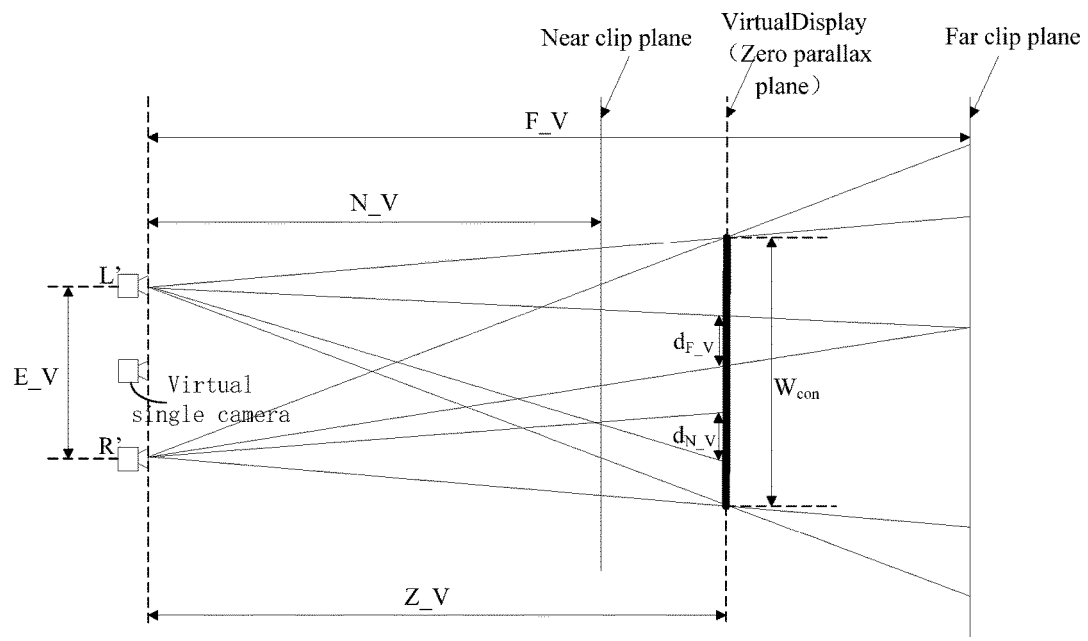
FIG. 3 illustrates an exemplary display optical path in an exemplary virtual scene consistent with disclosed embodiments.

FIG. 3 illustrates an exemplary optical path in an exemplary virtual scene consistent with disclosed embodiments. As shown in FIG. 3, two virtual single cameras (i.e., dual virtual cameras) may be disposed in the virtual scene, in which a left virtual camera L' may correspond to an image outputted by the observer's left eye and a right virtual camera R' may correspond to an image outputted by the observer's right eye.

In the virtual scene, a distance between the left virtual camera L' and the right virtual camera R' is E_V, a distance between the virtual single camera to the virtual screen is Z_V, a distance between the virtual single camera and the virtual near clipping plane is N_V, a distance between the virtual single camera and the virtual far clipping plane is F_V, a parallax in the virtual scene at the distance N_V is $d_{N\_V}$, a parallax in the virtual scene at the distance F_V is $d_{F\_V}$, and a width of the virtual screen is W_con. The virtual screen may be considered as a virtual zero parallax plane of the virtual scene.

The distance between the left virtual camera to the near clipping plane may be equal to the distance between the right virtual camera to the near clipping plane, both of which may be called as a distance between the virtual single camera and the virtual near clipping plane. The distance between the left virtual camera to the far clipping plane may be equal to the distance between the right virtual camera to the far clipping plane, both of which may be called as a distance between the virtual single camera and the virtual far clipping plane.

Figure 9:
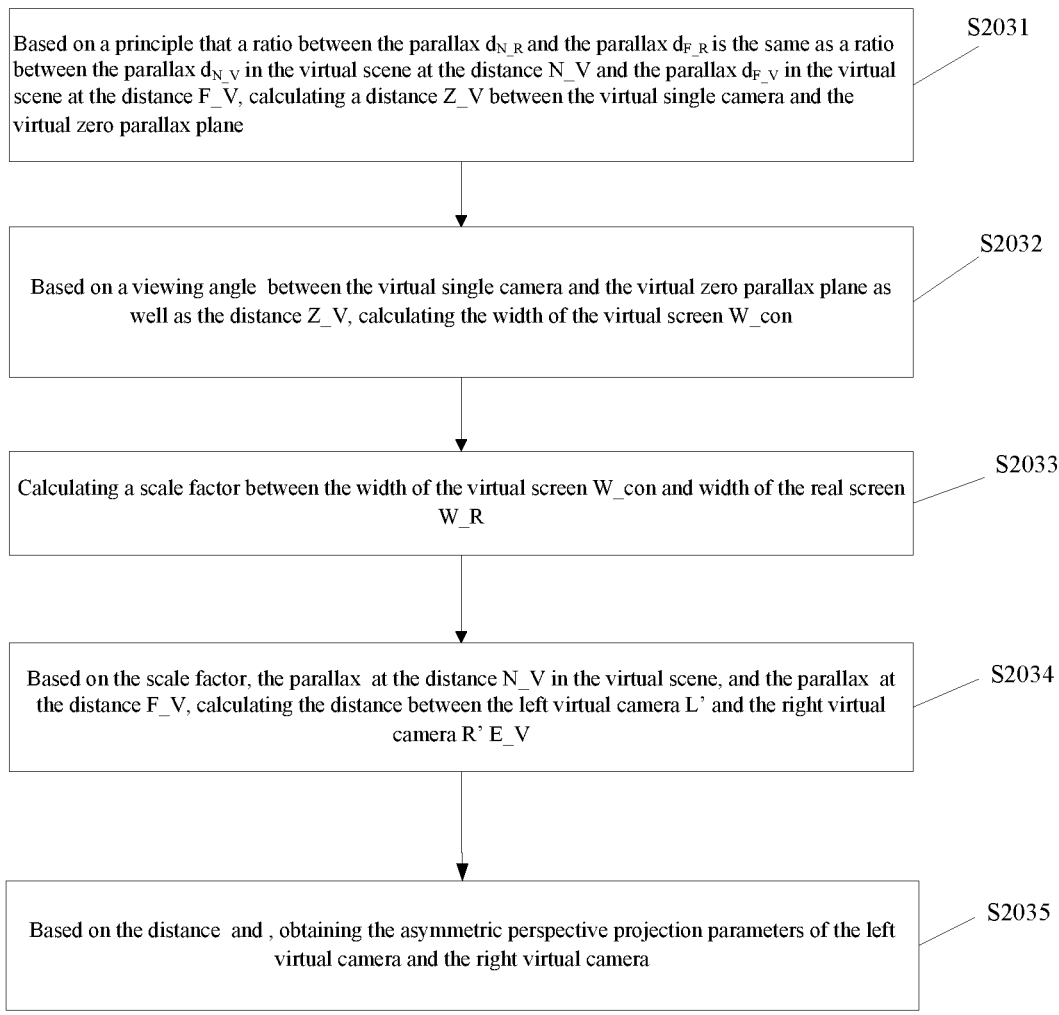
FIG. 9 illustrates a flow chart of an exemplary method for obtaining a distance between a left virtual camera and a right virtual camera, and asymmetric perspective projection parameters of the left virtual camera and the right virtual camera consistent with disclosed embodiments.

In one embodiment, according to FIG. 3, the distance E_V and asymmetric perspective projection parameters may be calculated following the steps illustrated in FIG. 9. FIG. 9 illustrates a flow chart of an exemplary method for obtaining a distance between a left virtual camera and a right virtual camera, and asymmetric perspective projection parameters of the left virtual camera and the right virtual camera consistent with disclosed embodiments.

As shown in FIG. 9, at the beginning, based on a principle that a ratio between the parallax $d_{N\_R}$ and the parallax $d_{F\_R}$ is the same as a ratio between the parallax $d_{N\_V}$ in the virtual scene at the distance N_V and the parallax $d_{F\_V}$ in the virtual scene at the distance F_V, i.e., $d_{N\_R}/d_{F\_R}=d_{N\_V}/d_{F\_V}$, a distance Z_V between the virtual single camera and the virtual zero parallax plane is calculated (S2031).

Returning to FIG. 3, based on a principle that the ratios of the lengths of their corresponding sides are equal when two figures are similar, the parallax $d_{N\_V}$ at the distance N_V in the virtual scene and the parallax $d_{F\_V}$ at the distance F_V in the virtual scene may be calculated as $$d_{N\_V} = \frac{E\_V * (Z\_V - N\_V)}{N\_V} \quad (1)$$

$$d_{F\_V} = \frac{E\_V * (F\_V - Z\_V)}{F\_V} \quad (2)$$

Equations (1) and (2) are also called equations for calculating the distance between the left virtual camera and the right virtual camera. Because the virtual scene and the real scene may have different units and different values of the parallax, to achieve a desired 3D effect, a ratio between the parallax $d_{N\_R}$ and the parallax $d_{F\_R}$ may be configured to be the same as a ratio between the parallax $d_{N\_V}$ in the virtual scene at the distance N_V and the parallax $d_{F\_V}$ in the virtual scene at the distance F_V, which is denoted as R. That is, $d_{N\_R}/d_{F\_R}=d_{N\_V}/d_{F\_V}=R$.

Thus, according to equations (1)-(2), R is expressed as:

$$\frac{d_{N\_R}}{d_{F\_R}} = R = \frac{d_{N\_V}}{d_{F\_V}} = \frac{(Z\_V - N\_V) * F\_V}{(F\_V - Z\_V) * N\_V} \quad (3)$$

According to equations (3), Z_V is calculated as:

$$Z\_V = \frac{R+1}{\frac{1}{N\_V} + \frac{R}{F\_V}} \quad (4)$$

where R is the ration between a parallax in the virtual scene at the distance N_V (denoted as $d_N$ and a parallax in the virtual scene at the distance F_V (denoted as $d_{F\_V}$), i.e., $R=d_{N\_R}/d_{F\_R}$.

Returning to FIG. 9, based on a viewing angle θ between the virtual single camera and the virtual zero parallax plane as well as the distance Z_V, the width of the virtual screen W_con is calculated (S2032).

Referring to FIG. 3, based on viewing angle θ between the virtual single camera and the virtual zero parallax plane as well as the distance Z_V, the width of the virtual screen W_con is calculated as:

$$W_{Con} = 2 * Z_V * \tan\left(\frac{\theta}{2}\right) \quad (5)$$

Returning to FIG. 9, after the width of the virtual screen W_con is calculated, a scale factor between the width of the virtual screen W_con and width of the real screen W_R is calculated (S2033).

$$\varphi = W\_Con/W\_R \quad (6)$$

Based on the scale factor φ, the parallax $d_{N\_V}$ at the distance N_V in the virtual scene, and the parallax $d_{F\_V}$ at the distance F_V, the distance between the left virtual camera L' and the right virtual camera R' E_V is calculated (S2034).

In particular, according to the equation of the parallax $d_{N\_V}$ at the distance N_V in the virtual scene, i.e., equation (1), E_V is calculated:

$$E\_V = \frac{d_{N\_V} * N\_V}{Z\_V - N\_V} \quad (7)$$

Because $d_{N\_V}=\varphi*d_{N\_R}$, equation (7) can be rewritten as:

$$E\_V = \frac{\varphi * d_{N\_R} * N\_V}{Z\_V - N\_V} \quad (8)$$

On the other hand, according to the equation of the parallax $d_{F\_V}$ at the distance F_V in the virtual scene, i.e., equation (2), E_V is calculated:

$$E\_V = \frac{d_{F\_V} * F\_V}{F\_V - Z\_V} \quad (9)$$

Because $d_{F\_V}=\varphi*d_{F\_R}$, equation (9) can be rewritten as:

$$E\_V = \frac{\varphi * d_{F\_R} * F\_V}{F\_V - Z\_V} \quad (10)$$

Based on the distance E_V and Z_V, the asymmetric perspective projection parameters of the left virtual camera and the right virtual camera are obtained (S2035).

Figure 4:
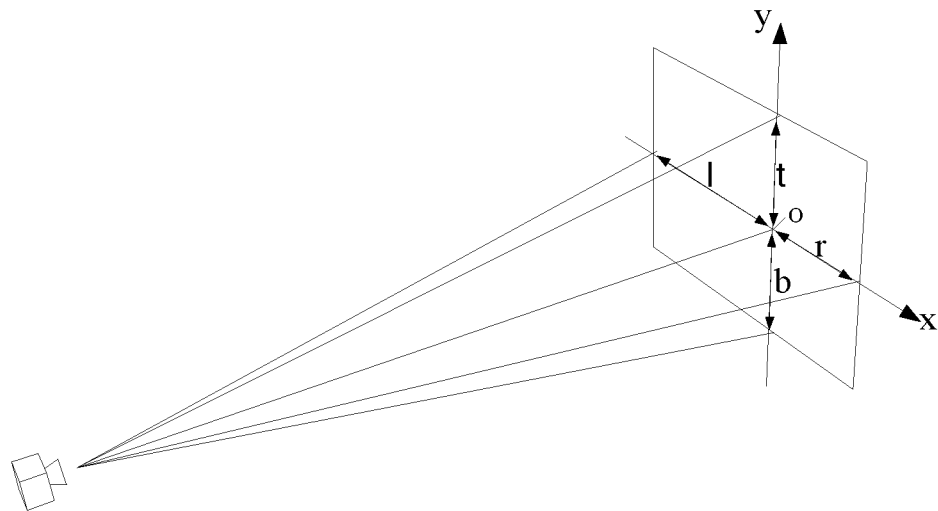
FIG. 4 illustrates an exemplary asymmetric perspective projection of a left virtual camera and a right virtual camera consistent with disclosed embodiments.

FIG. 4 illustrates an exemplary asymmetric perspective projection of a left virtual camera and a right virtual camera consistent with disclosed embodiments. Referring to FIG. 3 and FIG. 4, the asymmetric perspective projection parameters of the left virtual camera are calculated as:

$$\begin{cases} l_{left} = -\dfrac{W\_V}{2} + \dfrac{E\_V}{2} * N\_V/Z\_V \\ r_{left} = \dfrac{W\_V}{2} + \dfrac{E\_V}{2} * N\_V/Z\_V \\ t_{left} = \dfrac{H\_V}{2} \\ b_{left} = -\dfrac{H\_V}{2} \\ n_{left} = N\_V \\ f_{left} = F\_V \end{cases} \quad (11)$$

and the asymmetric perspective projection parameters of the right virtual camera are calculated as:

$$\begin{cases} l_{right} = -\dfrac{W\_V}{2} - \dfrac{E\_V}{2} * N\_V/Z\_V \\ r_{right} = \dfrac{W\_V}{2} - \dfrac{E\_V}{2} * N\_V/Z\_V \\ t_{right} = \dfrac{H\_V}{2} \\ b_{right} = -\dfrac{H\_V}{2} \\ n_{right} = N\_V \\ f_{right} = F\_V \end{cases} \quad (12)$$

$L_{left}$, $r_{left}$, $t_{left}$ and $b_{left}$ respectively denote coordinates of an upper boundary, a lower boundary, a left boundary, and a right boundary of the asymmetric perspective projection of the left virtual camera. As shown in FIG. 4, the origin of the coordinate system is denoted by a point O. $n_{left}$ denotes a distance between the left virtual camera and the virtual near clipping plane in the asymmetric perspective projection parameters of the left virtual camera, and $f_{left}$ denotes a distance between the left virtual camera and the virtual far clipping plane in the asymmetric perspective projection parameters of the left virtual camera.

$L_{right}$, $r_{right}$, $t_{right}$ and $b_{right}$ respectively denote coordinates of an upper boundary, a lower boundary, a left boundary, and a right boundary of the asymmetric perspective projection of the right virtual camera. $n_{right}$ denotes a distance between the right virtual camera and the virtual near clipping plane in the asymmetric perspective projection parameters of the right virtual camera, and $f_{right}$ denotes a distance between the right virtual camera and the virtual far clipping plane in the asymmetric perspective projection parameters of the right virtual camera.

W_V denotes a width of the virtual near clipping plane of the virtual scene, and H_V denotes a height of the virtual near clipping plane of the virtual scene.

Returning to FIG. 2, based on the calculated distance E_V and the virtual single camera, the left virtual camera and the right virtual camera is obtained; based on the left virtual camera, the right virtual camera, and the asymmetric perspective projection parameters of the right and left virtual cameras, a perspective projection transformation of the scene of the virtual single camera is performed, the virtual stereoscopic scene is created and displayed, and a mapping between the virtual scene and the real scene is generated (S204).

In particular, based on the distance E_V and asymmetric perspective projection parameters, transforming the virtual scene to build the virtual stereoscopic scene is well understood by those skilled in the art, thus, is not explained here.

In one embodiment, the perspective projection transformation of the scene of the left virtual camera may be realized by multiplying the coordinates of the stereoscopic scene captured by the left virtual camera by a left perspective projection matrix M1, where M1 is expressed as:

$$M_1 = \begin{pmatrix} \dfrac{2n_{left}}{r_{left} - l_{left}} & 0 & \dfrac{r_{left} + l_{left}}{r_{left} - l_{left}} & 0 \\ 0 & \dfrac{2n_{left}}{t_{left} - b_{left}} & \dfrac{t_{left} + b_{left}}{t_{left} - b_{left}} & 0 \\ 0 & 0 & -\dfrac{f_{left} + n_{left}}{f_{left} - n_{left}} & \dfrac{2f_{left} * n_{left}}{f_{left} - n_{left}} \\ 0 & 0 & -1 & 0 \end{pmatrix}, \quad (13)$$

and the perspective projection transformation of the scene of the right virtual camera may be realized by multiplying the coordinates of the stereoscopic scene captured by the right virtual camera by a right perspective projection matrix M2, where M2 is expressed as:

$$M_2 = \begin{pmatrix} \dfrac{2n_{right}}{r_{right} - l_{right}} & 0 & \dfrac{r_{right} + l_{right}}{r_{right} - l_{right}} & 0 \\ 0 & \dfrac{2n_{right}}{t_{right} - b_{right}} & \dfrac{t_{right} + b_{right}}{t_{right} - b_{right}} & 0 \\ 0 & 0 & -\dfrac{f_{right} + n_{right}}{f_{right} - n_{right}} & \dfrac{2f_{right} * n_{right}}{f_{right} - n_{right}} \\ 0 & 0 & -1 & 0 \end{pmatrix} \quad (14)$$

The perspective projection matrix is well known by those skilled in the art, and a derivation of the matrix can be found in textbooks and Internet, thus, is not explained here.

The disclosed method for realizing a virtual stereoscopic scene based on mapping may provide a standard method for converting a virtual scene to a virtual stereoscopic scene presented in a real scene. That is, provided that a ratio between the parallax in the real scene at the distance N_R (denoted as $d_{N\_R}$) and the parallax in the real scene at the distance F_R (denoted as $d_{F\_R}$) is the same as a ratio between the parallax in the virtual scene at the distance N_V (denoted as $d_{N\_V}$) and the parallax in the virtual scene at the distance F_V (denoted as $d_{F\_V}$), i.e., $d_{N\_R}/d_{F\_R} = d_{N\_V}/d_{F\_V}$, the distance between the left virtual camera and the right virtual camera (denoted as E_V), as well as, asymmetric perspective projection parameters of the left virtual camera and the right virtual camera may be obtained.

Based on the calculated distance E_V and the asymmetric perspective projection parameters, the virtual stereoscopic scene of the virtual scene may be created. That is, the virtual scene between N_V (i.e., the distance between the virtual single camera and the virtual near clipping plane) and F_V (i.e., the distance between the virtual single camera and the virtual far clipping plane) may be projected to the real scene between N_R (i.e., the maximum convex displaying distance of the real screen) and F_R (i.e., the maximum concave displaying distance of the real screen). A desired fusion between the virtual stereoscopic scene and the real observation space may be realized, the generated 3D effect may be improved and the user experience may be enhanced accordingly.

Further, the disclosed method, apparatus and system for realizing a virtual stereoscopic scene based on mapping may be simple and easy to be developed. Through combining the virtual scene corresponding to the stereoscopic scene to be created, the asymmetric perspective projection parameters of the left virtual camera and the right virtual camera, and corresponding stereoscopic hardware devices, the virtual scene may be directly and rapidly projected to the real scene. Thus, the stereoscopic virtual scene may be presented in the real scene, and the corresponding 3D effect may be adjusted according to various settings determined by uses and developers. The stereoscopic hardware devices may include 3D projectors, 3D TVs, virtual reality (VR) helmets, and augmented reality (AR) eyewear, etc.

In the disclosed embodiments, the virtual scene may be converted to a stereoscopic 3D (S3D) scene. In another embodiment, the virtual scene may be converted to an autostereoscopic 3D scene.

For example, the disclosed method may be used in a theater which has a left projector and a right projector. Then, N_R may be the maximum convex displaying distance of the theater screen in the real scene, and F_R may be the maximum concave displaying distance of the theater screen in the real scene. W_R may be the width of the theater screen, E_R may be a distance between the left eye and the right eye of the observer in the real scene (i.e., pupil distance), and Z_R may be the distance from the observer's eyes to the theater screen in the real scene. In one embodiment, Z_R may be the distance from an observer sitting in the center of the theater to the theater screen in the real scene.

Then, the scene of the left virtual camera obtained from the perspective projection transformation may be provided to the left projector, and the scene of the right virtual camera obtained from the perspective projection transformation may be provided to the right projector. The left and right projectors experience a polarization process, for example, some polarizing filters may be attached to the left and right projector, while the observer may wear polarized eyeglasses. Thus, the scene of the left virtual camera obtained from the perspective projection transformation may be received by the observer's left eye, and the scene of the right virtual camera obtained from the perspective projection transformation may be by the observer's right eye.

The disclosed method may be used in a virtual reality (VR) helmet which has a left display screen and a right display screen. Then, N_R may be the maximum convex displaying distance of the screen in the real scene, and F_R may be the maximum concave displaying distance of the screen in the real scene. W_R may be the width of the screen, E_R may be a distance between the left eye and the right eye of the observer in the real scene (i.e., pupil distance), and Z_R may be the distance from the observer's eyes to the screen in the real scene.

The scene of the left virtual camera obtained from the perspective projection transformation may be provided to the left display screen of the VR helmet, and the scene of the right virtual camera obtained from the perspective projection transformation may be provided to the right display screen of the VR helmet.

In one embodiment, the VR helmet may only include one display screen, on which the scene of the left virtual camera and the scene of the right virtual camera may be displayed alternately at very high frequency. Thus, the observer may be able to see a reconstructed virtual stereoscopic scene. The frequency may be 120-240 Hz. The higher frequency, the more comfortable the observer may feel.

The disclosed method may be used in augmented reality (AR) eyewear which has a left display lens and a right display lens. Then, N_R may be the maximum convex displaying distance of the display lens in the real scene, and F_R may be the maximum concave displaying distance of the display lens in the real scene. W_R may be the width of the display lens, E_R may be a distance between the left eye and the right eye of the observer in the real scene (i.e., pupil distance), and Z_R may be the distance from the observer's eyes to the display lens in the real scene.

The scene of the left virtual camera obtained from the perspective projection transformation may be provided to the left display lens, and the scene of the right virtual camera obtained from the perspective projection transformation may be provided to the right display lens.

The present disclosure further provides an embodiment with detailed parameters to further explain how the virtual stereoscopic scene is generated, i.e., further explain the method for realizing a virtual stereoscopic scene based on mapping illustrated in FIG. 1.

Assuming that, in a real scene, the maximum convex displaying distance of the real screen N_R is 40 mm, the maximum concave displaying distance of the real screen F_R is 50 mm; the width of the real screen W_R is 435 mm; the distance between an observer's two eyes E_R is 65 mm, and the distance from the observer's eyes to the real screen Z_R is 500 mm. In a virtual scene, the distance between each virtual single camera and a near clipping plane N_V is 1.0 px (pixel), the distance between each virtual single camera and a far clipping plane F_V is 50.0 px (pixel), and the viewing angle of the virtual scene $\theta$ is 90°.

Thus, the parallax in the real scene is calculated as:

$$d_{N\_R} = \frac{N\_R * E\_R}{Z\_R - N\_R} = \frac{40 * 65}{500 - 40} \approx 5.65 \text{ mm}$$

$$d_{F\_R} = \frac{F\_R * E\_R}{Z\_R + F\_R} = \frac{50 * 65}{500 + 50} \approx 5.91 \text{ mm}$$

The ration R between the parallax $d_{N\_R}$ and $d_{F\_R}$ is calculated as:

$$R = \frac{d_{N\_R}}{d_{F\_R}} = \frac{5.65}{5.91} \approx 0.96$$

The distance from each virtual single camera to the virtual screen Z_V is calculated as:

$$Z\_V = \frac{R+1}{\frac{1}{N\_V} + \frac{R}{F\_V}} = \frac{0.96 + 1.0}{\frac{1}{1.0} + \frac{0.96}{50.0}} \approx 1.92$$

The width of the virtual screen is calculated as:

$$W\_con = 2.0 * Z\_V * \tan\left(\frac{\theta}{2}\right) \approx 3.84$$

The scale factor φ between the virtual screen and the real screen is calculated as:

$$\varphi = \frac{W\_con}{W\_R} \approx 0.0088$$

The distance between the left virtual camera and the right virtual camera as E_V is calculated as:

$$E\_V = \frac{d_{N\_V} * N\_V}{Z\_V - N\_V} = \frac{\varphi * d_{N\_R} * N\_V}{Z\_V - N\_V} \approx 0.054$$

Based on the calculated distance Z_V and E_V, each virtual single camera may be deflected (i.e., the left virtual camera and the right virtual camera may be generated), and the virtual scene (i.e., asymmetric perspective projection) may be converted. Thus, the virtual stereoscopic scene may be created, and a desired 3D effect may be realized.

In the disclosed method shown in FIG. 1, for a plurality of virtual scenes, the distance N_V and F_V may be fixed, i.e., each virtual scene may have the fixed distance N_V and F_V. Accordingly, the distance E_V and the asymmetric perspective projection parameters of the right and left virtual cameras may be calculated based on the fixed N_V and F_V. However, in each virtual scene, the distance between the virtual camera to the virtual near clipping plane (denoted as N_V) is often smaller than or equal to a distance from the virtual camera to a closet location of the object with respect to the virtual camera (denoted as N_O), and the distance between the virtual camera to the virtual far clipping plane (denoted as F_V) is often larger than or equal to a distance from the virtual camera to a furthest location of the object with respect to the virtual camera (denoted as F_O).

That is, depending on different virtual scenes and different physical objects in the virtual scene, the distance N_O and F_O may be varied in different virtual scenes. However, because each virtual scene has the fixed distance N_V and F_V, the 3D effect of the objects in the generated virtual stereoscopic scene may be poor.

Figure 8:
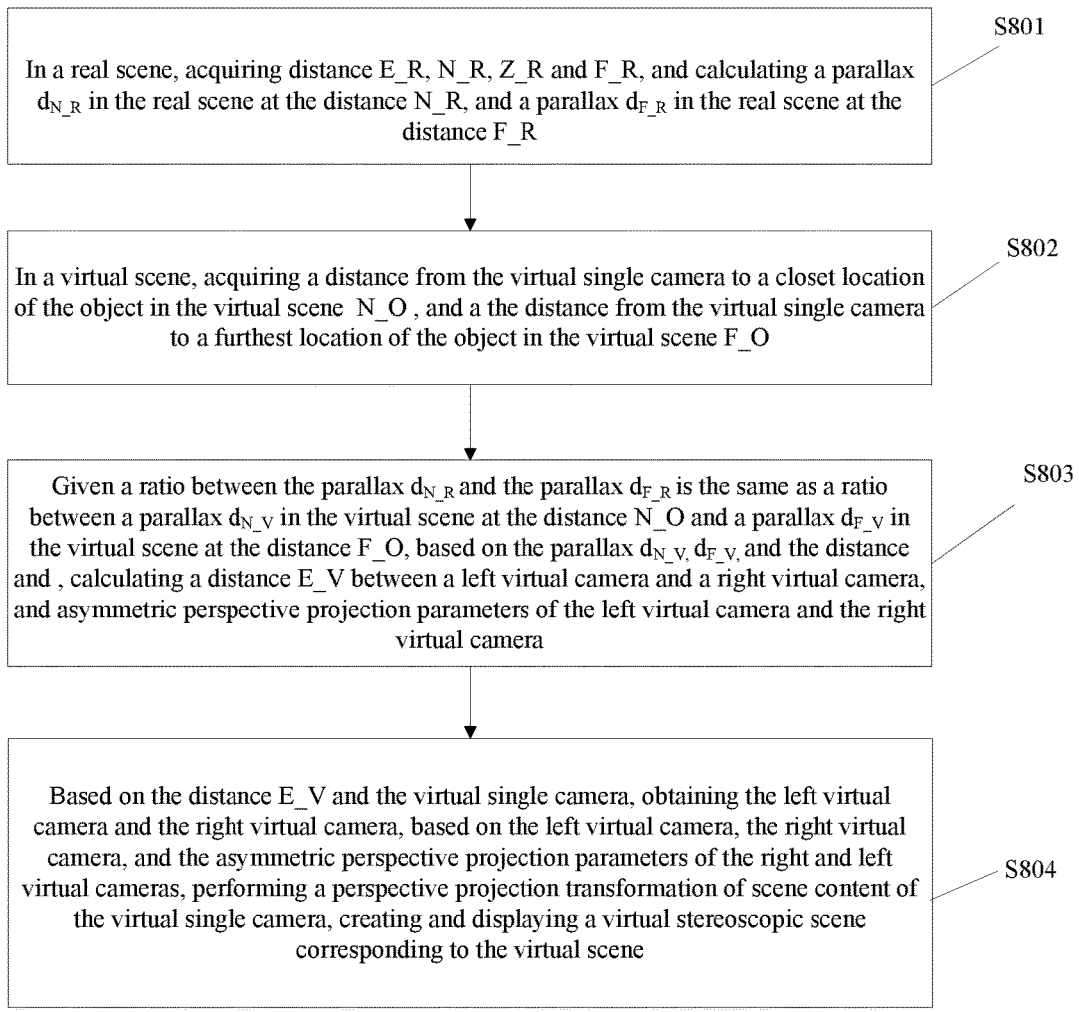
FIG. 8 illustrates a flow chart of another exemplary method for realizing a virtual stereoscopic scene based on mapping consistent with disclosed embodiments.

To further improve the 3D effect of the objects in the generated virtual stereoscopic scene, in another embodiment, the distance E_V and Z_V may be calculated based on the distance from the virtual single camera to a closet location of the object in the virtual scene (denoted as N_O) and the distance from the virtual single camera to a furthest location of the object in the virtual scene (denoted as F_O), instead of the distance between the virtual single camera to the virtual near clipping plane (denoted as N_V) and the distance between the virtual single camera to the virtual far clipping plane (denoted as F_V). FIG. 8 illustrates a flow chart of another exemplary method for realizing a virtual stereoscopic scene based on mapping consistent with disclosed embodiments.

The similarities between FIG. 8 and FIG. 1 are not repeated here, while certain differences may be explained. As shown in FIG. 8, in step S802, the distance from the virtual single camera to a closet location of the object in the virtual scene (denoted as N_O) and the distance from the virtual camera to a furthest location of the object in the virtual scene (denoted as F_O) are obtained. The obtained distance N_O and F_O are further applied to the calculations in following steps S803 and S804. Compared FIG. 1 with FIG. 8, the distance N_V and F_V in FIG. 1 are replaced by the distance N_O and F_O.

Thus, in each of the plurality of virtual scene, the distance E_V and Z_V may be calculated based on its own N_O and F_O. Thus, when each virtual scene is projected to a real scene, the virtual scene between N_O and F_O may be projected to the real scene between N_R and F_R. A compatibility between every virtual scene and the real scene may be significantly improved, and the generated 3D effect may be enhanced accordingly.

The distance N_O and F_O may be obtained in various approaches. For example, for each virtual scene created by a graphical engine (such as D3D or openGL), a depth buffer may be generated to store depth data of the virtual scene. Based on the depth data of the virtual scene obtained from the depth buffer, the distance N_O and F_O of the virtual scene may be calculated. In particular, through traversing the depth data of each pixel of the virtual scene, a maximum depth and a minimum depth of the virtual scene may be obtained respectively. Then the distance N_O and F_O of the virtual scene may be obtained according to the maximum depth and the minimum depth of the virtual scene, respectively. Those skilled in the art may choose any appropriate approach to obtain N_O and F_O, which is not limited by the present disclosure.

The present disclosure further provides an embodiment with detailed parameters to further explain the method for realizing a virtual stereoscopic scene based on mapping illustrated in FIG. 8.

Assuming that, in a real scene, the maximum convex displaying distance of the real screen N_R is 40 mm, the maximum concave displaying distance of the real screen F_R is 50 mm; the width of the real screen W_R is 435 mm; the distance between an observer's two eyes E_R is 65 mm, and the distance from the observer's eyes to the real screen Z_R is 500 mm. In a virtual scene, the distance between each virtual single camera and a near clipping plane N_V is 1.0 px (pixel), the distance between each virtual single camera and a far clipping plane F_V is 50.0 px (pixel), and the viewing angle of the virtual scene θ is 90°. The distance from the virtual camera to a closet location of the object in the virtual scene N_O is 5.0 px (pixel), and the distance from the virtual camera to a furthest location of the object in the virtual scene F_O is 20.0 px (pixel). As discussed above, in the virtual scene, the distance N_V is often smaller than or equal to the distance N_O, and the distance F_V is often larger than or equal to the distance F_O.

Thus, the parallax in the real scene is calculated as:

$$d_{N\_R} = \frac{N\_R * E\_R}{Z\_R - N\_R} = \frac{40 * 65}{500 - 40} \approx 5.65 \text{ mm}$$

$$d_{F_R} = \frac{F_R * E_R}{Z_R + F_R} = \frac{50 * 65}{500 + 50} \approx 5.91 \text{ mm}$$

The ration R between the parallax dN_R and dF_R is calculated as:

$$R = \frac{d_{N\_R}}{d_{F\_R}} = \frac{5.65}{5.91} \approx 0.96$$

The distance from each virtual single camera to the virtual screen Z_V is calculated as:

$$Z\_V = \frac{R+1}{\frac{1}{N\_O} + \frac{R}{F\_O}} = \frac{0.96+1.0}{\frac{1}{5.0} + \frac{0.96}{20.0}} \approx 7.9$$

The width of the virtual screen is calculated as:

$$W\_V = 2.0 * Z\_V * \tan\left(\frac{\theta}{2}\right) = 15.8$$

The scale factor φ between the virtual screen and the real screen is calculated as:

$$\varphi = \frac{W\_V}{W\_R} = 0.0363$$

The distance between the left virtual camera and the right virtual camera as E_V is calculated as:

$$E\_V = \frac{d_{N\_V} * N\_O}{Z\_V - N\_O} = \frac{\varphi * d_{N\_R} * N\_O}{Z\_V - N\_O} \approx 0.353$$

Based on the calculated distance Z_V and E_V, each virtual single camera may be deflected (i.e., the left virtual camera and the right virtual camera may be generated), and the virtual scene (i.e., asymmetric perspective projection) may be converted. Thus, the virtual stereoscopic scene may be created, and an improved 3D effect may be realized.

Compared to the method shown in FIG. 1, in the method shown in FIG. 8, the length of the distance N_V and F_V in FIG. 1 are replaced by or assigned with the length of the distance N_O and F_O. Thus, when each virtual scene is projected to a real scene, the virtual scene between N_O and F_O may be projected to the real scene between a maximum convex point (i.e., a furthest point of the real scene with respect to the observer's eyes) and a maximum concave point (i.e., a closest point of the real scene with respect to the observer's eyes), i.e., the virtual scene between N_O and F_O may be projected to the real scene between N_R and F_R. A compatibility between every virtual scene and the real scene may be significantly improved, and the generated 3D effect may be enhanced accordingly.

In fact, N_V and F_V may be considered as a special case of N_O and F_O, respectively. For example, when the closet location of the object in the virtual scene is disposed in the virtual near clipping plane of the virtual scene, N_V=N_O, and when the furthest location of the object in the virtual scene is disposed in the virtual far clipping plane of the virtual scene, F_V=F_O. Because the distance N_V is often smaller than or equal to the distance N_O, and the distance F_V is often larger than or equal to the distance F_O, a range between N_O and F_O may be within a range between N_V and F_V.

Figure 5:
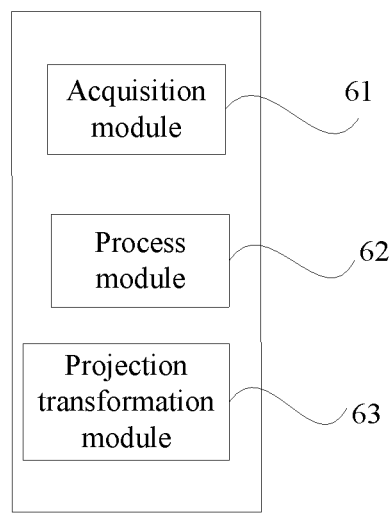
FIG. 5 illustrates an exemplary apparatus for realizing a virtual stereoscopic scene based on mapping consistent with disclosed embodiments.

The present disclosure also provides an improved apparatus for realizing a virtual stereoscopic scene based on mapping. FIG. 5 illustrates an exemplary apparatus for realizing a virtual stereoscopic scene based on mapping consistent with disclosed embodiments. As shown in FIG. 5, the apparatus may include an acquisition module 61, a process module 62, and a projection transformation module 63. Other modules may also be included.

In particular, the acquisition module 61 may be configured to obtain a distance between an observer's two eyes (denoted as E_R), a maximum convex displaying distance of a real screen (denoted as N_R), a distance from the observer's eyes to the real screen (denoted as Z_R), and a maximum concave displaying distance of the real screen (denoted as F_R) in a real scene. The acquisition module 61 may be further configured to obtain a distance between a virtual single camera and a virtual near clipping plane (denoted as N_V), and a distance between a virtual single camera and a virtual far clipping plane (denoted as F_V) in a virtual scene.

The process module 62 may be configured to obtain a parallax in the real scene at the distance N_R (denoted as $d_{N\_R}$), and a parallax in the real scene at the distance F_R (denoted as $d_{F\_R}$), based on the obtained distance E_R, N_R, Z_R and F_R. Provided that a ratio between the parallax $d_{N\_R}$ and the parallax $d_{F\_R}$ is the same as a ratio between a parallax in the virtual scene at the distance N_V (denoted as $d_{N\_V}$) and a parallax in the virtual scene at the distance F_V (denoted as $d_{F\_V}$), i.e., $d_{N\_R}/d_{F\_R}=d_{N\_V}$, based on the parallax $d_{N\_V}$, $d_{F\_V}$, and the distance N_V and F_V, the process module 62 may be configured to obtain a distance between a left virtual camera and a right virtual camera (denoted as E_V), as well as, asymmetric perspective projection parameters of a left virtual camera and a right virtual camera.

Based on the calculated distance E_V and the single virtual camera, the projection transformation module 63 may be configured to obtain a left virtual camera and a right virtual camera. Based on the obtained left virtual camera and right virtual camera and asymmetric perspective projection parameters of the left virtual camera and the right virtual camera, the projection transformation module 63 may be configured to perform a perspective projection transformation of the scene of the virtual single camera, construct and display a corresponding virtual stereoscopic scene. Thus, a mapping between the virtual scene and the real scene may be generated.

In one embodiment, the process module 62 may further include a parallax calculation module, and an asymmetric perspective projection parameter calculation module. The parallax calculation module may be configured to obtain equations $$d_{N\_R} = \frac{N\_R * E\_R}{Z\_R - N\_R} \text{ and } d_{F\_R} = \frac{F\_R * E\_R}{Z\_R + F\_R},$$

i.e., equations for calculating $d_{N\_R}$ and $d_{F\_R}$, based on a principle that the ratios of the lengths of their corresponding sides are equal when two figures are similar. Based on the obtained distance E_R, N_R, Z_R and F_R, the parallax calculation module may be further configured to calculate the parallax $d_{N\_R}$ and $d_{F\_R}$.

Provided that a ratio between the parallax $d_{N\_R}$ and the parallax $d_{F\_R}$ is the same as a ratio between a parallax in the virtual scene at the distance N_V (denoted as $d_{N\_V}$) and a parallax in the virtual scene at the distance F_V (denoted as $d_{F\_V}$), i.e., $d_{N\_R}/d_{F\_R}=d_{N\_V}$, the asymmetric perspective projection parameter calculation module may be configured to calculate the distance from the left/right virtual camera to the virtual zero parallax plane Z_V.

Based on a viewing angle θ between the virtual single camera and the virtual zero parallax plane as well as the distance Z_V, the asymmetric perspective projection parameter calculation module may be further configured to calculate a width of the virtual screen W_con.

Based on the width of the virtual screen W_con and the width of the real screen W_R, the asymmetric perspective projection parameter calculation module may be further configured to calculate a scale factor φ between the width of the virtual screen W_con and width of the real screen W_R.

Based on the scale factor φ and equations for calculating a distance between the left virtual camera and the right virtual camera, the asymmetric perspective projection parameter calculation module may be further configured to calculate the distance E_V between the left virtual camera and the right virtual camera in the virtual scene.

Based on the distance E_V and Z_V, the asymmetric perspective projection parameter calculation module may be further configured to calculate the asymmetric perspective projection parameters of the left virtual camera and the right virtual camera.

In particular, the asymmetric perspective projection parameters of the left virtual camera may include:

$$l_{left} = -\frac{W\_V}{2} + \frac{E\_V}{2} * N\_V/Z\_V$$
$$r_{left} = \frac{W\_V}{2} + \frac{E\_V}{2} * N\_V/Z\_V$$
$$t_{left} = \frac{H\_V}{2}$$
$$b_{left} = -\frac{H\_V}{2}$$
$$n_{left} = N\_V$$
$$f_{left} = F\_V$$

and the asymmetric perspective projection parameters of the right virtual camera may include:

$$\begin{cases} l_{right} = -\frac{W\_V}{2} - \frac{E\_V}{2} * N\_V/Z\_V \\ r_{right} = \frac{W\_V}{2} - \frac{E\_V}{2} * N\_V/Z\_V \\ t_{right} = \frac{H\_V}{2} \\ b_{right} = -\frac{H\_V}{2} \\ n_{right} = N\_V \\ f_{right} = F\_V \end{cases}$$

$L_{left}$, $r_{left}$, $t_{left}$ and $b_{left}$ respectively denote coordinates of an upper boundary, a lower boundary, a left boundary, and a right boundary of the asymmetric perspective projection of the left virtual camera. $n_{left}$ denotes a distance between the left virtual camera and the virtual near clipping plane in the asymmetric perspective projection parameters of the left virtual camera, and $f_{left}$ denotes a distance between the left virtual camera and the virtual far clipping plane in the asymmetric perspective projection parameters of the left virtual camera.

$L_{right}$, $r_{right}$, $t_{right}$ and $b_{right}$ respectively denote coordinates of an upper boundary, a lower boundary, a right boundary, and a right boundary of the asymmetric perspective projection of the right virtual camera. $n_{right}$ denotes a distance between the right virtual camera and the virtual near clipping plane in the asymmetric perspective projection parameters of the right virtual camera, and $f_{right}$ denotes a distance between the right virtual camera and the virtual far clipping plane in the asymmetric perspective projection parameters of the right virtual camera.

W_V denotes a width of the virtual near clipping plane of the virtual scene, and H_V denotes a height of the virtual near clipping plane of the virtual scene.

In certain embodiments, the projection transformation module 63 may be configured to multiply the coordinates of the stereoscopic scene captured by the left virtual camera by a left perspective projection matrix M1 to realize the perspective projection transformation of the scene of the left virtual camera, and multiply the coordinates of the stereoscopic scene captured by the right virtual camera by a right perspective projection matrix M2 to realize the perspective projection transformation of the scene of the right virtual camera, where the left perspective projection matrix M1 may be expressed as:

$$M_1 = \begin{pmatrix} \frac{2n_{left}}{r_{left} - l_{left}} & 0 & \frac{r_{left} + l_{left}}{r_{left} - l_{left}} & 0 \\ 0 & \frac{2n_{left}}{t_{left} - b_{left}} & \frac{t_{left} + b_{left}}{t_{left} - b_{left}} & 0 \\ 0 & 0 & -\frac{f_{left} + n_{left}}{f_{left} - n_{left}} & \frac{2f_{left} * n_{left}}{f_{left} - n_{left}} \\ 0 & 0 & -1 & 0 \end{pmatrix},$$

and the right perspective projection matrix M2 may be expressed as:

$$M_2 = \begin{pmatrix} \frac{2n_{right}}{r_{right} - l_{right}} & 0 & \frac{r_{right} + l_{right}}{r_{right} - l_{right}} & 0 \\ 0 & \frac{2n_{right}}{t_{right} - b_{right}} & \frac{t_{right} + b_{right}}{t_{right} - b_{right}} & 0 \\ 0 & 0 & -\frac{f_{right} + n_{right}}{f_{right} - n_{right}} & \frac{2f_{right} * n_{right}}{f_{right} - n_{right}} \\ 0 & 0 & -1 & 0 \end{pmatrix}.$$

Further, in one embodiment, in the virtual scene, the distance between the virtual single camera to the virtual near clipping plane (denoted as N_V) and the distance between the virtual single camera to the virtual far clipping plane (denoted as F_V) may be assigned with a value of N_O and F_O, respectively, where N_O may refer to a distance from the virtual single camera to a closet location of the object with respect to the virtual single camera, and F_O may refer to a distance from the virtual single camera to a furthest location of the object with respect to the virtual single camera.

Accordingly, the acquisition module 61 may be further configured to obtain a distance from the virtual single camera to a closet location of the object with respect to the virtual single camera (denoted as N_O) and a distance from the virtual single camera to a furthest location of the object with respect to the virtual single camera (denoted as F_O), and assign the obtained N_O and F_O to N_V and F_V respectively.

Because the disclosed apparatus shown in FIG. 5 and the disclosed method shown in FIG. 1 and FIG. 8 may be based on a same conception, the information exchange among the various modules and the functions performed by the various modules in the disclosed apparatus shown in FIG. 5 may refer to the description of the disclosed method shown in FIG. 1 and FIG. 8.

Given the virtual stereoscopic scene and the asymmetric perspective projection parameters of the left virtual camera and the right virtual camera, the disclosed apparatus may be able to directly and rapidly project the virtual stereoscopic scene to the real scene. The corresponding 3D effect may be adjusted according to various settings determined by uses and developers.

Figure 6:
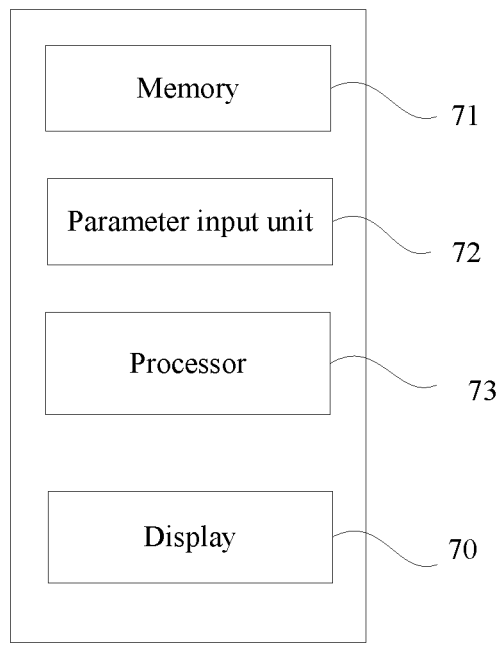
FIG. 6 illustrates a block diagram of an exemplary smart terminal for realizing a virtual stereoscopic scene based on mapping consistent with disclosed embodiments.

FIG. 6 illustrates a block diagram of an exemplary smart terminal for realizing a virtual stereoscopic scene based on mapping consistent with disclosed embodiments. The smart terminal may be any appropriate content-presentation device capable of presenting, images, and videos, etc. For example, the smart terminal may be a smart phone, a laptop, a game player, and a video player, etc.

As shown in FIG. 6, the smart terminal may include a display 70, a memory 71, a parameter input unit 72, and a processor 73. Other components may be added and certain components may be removed without departing from the principles of the disclosed embodiments. In particular, the display 70, the memory 71, and the parameter input unit 72 may be connected to the processor 73, respectively.

The parameter input unit 72 may be configured to input a distance between an observer's two eyes (denoted as E_R), a maximum convex displaying distance of a real screen (denoted as N_R), a distance from the observer's eyes to the real screen (denoted as Z_R), and a maximum concave displaying distance of the real screen (denoted as F_R) in a real scene. The parameter input unit 72 may be further configured to input a distance between a virtual single camera and a virtual near clipping plane (denoted as N_V), and a distance between a virtual single camera and a virtual far clipping plane (denoted as F_V) in a virtual scene. The parameter input unit 72 may be further configured to save the input distances in the memory 71.

The processor 73 may be configured to obtain a parallax in the real scene at the distance N_R (denoted as $d_{N\_R}$), and a parallax in the real scene at the distance F_R (denoted as $d_{F\_R}$), based on the obtained distance E_R, N_R, Z_R and F_R. Provided that a ratio between the parallax $d_{N\_R}$ and the parallax $d_{F\_R}$ is the same as a ratio between a parallax in the virtual scene at the distance N_V (denoted as $d_{N\_V}$) and a parallax in the virtual scene at the distance F_V (denoted as $d_{F\_V}$), i.e., $d_{N\_R}/d_{F\_R}=d_{N\_V}/d_{F\_V}$, based on the parallax $d_{N\_V}$, $d_{F\_V}$, and the distance N_V and F_V, the processor 73 may be configured to obtain a distance between a left virtual camera and a right virtual camera (denoted as E_V), as well as, asymmetric perspective projection parameters of a left virtual camera and a right virtual camera.

Based on the calculated distance E_V and the single virtual camera, the processor 73 may be configured to obtain a left virtual camera and a right virtual camera. Based on the obtained left virtual camera and right virtual camera and asymmetric perspective projection parameters of the left virtual camera and the right virtual camera, the processor 73 may be configured to perform a perspective projection transformation of the scene of the virtual single camera, construct and display a corresponding virtual stereoscopic scene on the display 70. Thus, a mapping between the virtual scene and the real scene may be generated.

Further, the processor 73 may include any appropriate type of central processing unit (CPU), graphic processing unit (GPU), general purpose microprocessor, digital signal processor (DSP) or microcontroller, and application specific integrated circuit (ASIC). The processor 42 may execute sequences of computer program instructions to perform various processes associated with the smart terminal.

The display 71 may be any appropriate type of display, such as plasma display panel (PDP) display, field emission display (FED), cathode ray tube (CRT) display, liquid crystal display (LCD), organic light emitting diode (OLED) display, light emitting diode (LED) display, or other types of displays.

The smart terminal may also include other components (not drawn in FIG. 6), such as system memory, a system bus, an output unit, and a mass storage device. The memory 71 here is just a general term that may include read-only memory (ROM), random access memory (RAM) and etc. The ROM may store necessary software for a system, such as system software. The RAM may store real-time data, such as images for displaying.

The system bus may provide communication connections, such that the display device may be accessed remotely and/or communicate with other systems via various communication protocols, such as transmission control protocol/internet protocol (TCP/IP), hypertext transfer protocol (HTTP), etc.

The input unit 71 may be provided for users or developers to input information into the smart device. The output unit may be provided for users or developers to receive information from the smart device. For example, the input/output unit may include any appropriate input device, such as a remote control, a keyboard, a mouse, an electronic tablet, voice communication devices, or any other optical or wireless input devices.

Further, the mass storage device may include any appropriate type of mass storage medium, such as a CD-ROM, a hard disk, an optical storage, a DVD drive, or other type of storage devices.

Because the disclosed apparatus shown in FIG. 6 and the disclosed method shown in FIG. 1 and FIG. 8 may be based on a same conception, the information exchange among the various modules and the functions performed by the various modules in the disclosed apparatus shown in FIG. 6 may refer to the description of the disclosed method shown in FIG. 1 and FIG. 8.

Given the virtual stereoscopic scene and the asymmetric perspective projection parameters of the left virtual camera and the right virtual camera, the disclosed smart device may be able to directly and rapidly project the virtual stereoscopic scene to the real scene. The corresponding 3D effect may be adjusted according to various settings determined by uses and developers.

Figure 7:
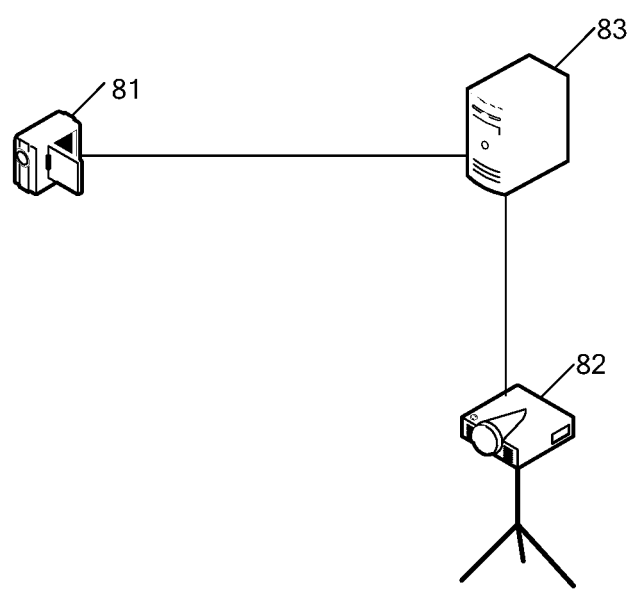
FIG. 7 illustrates an exemplary system for realizing a virtual stereoscopic scene based on mapping consistent with disclosed embodiments.

FIG. 7 illustrates an exemplary system for realizing a virtual stereoscopic scene based on mapping consistent with disclosed embodiments. Any disclosed methods for realizing a virtual stereoscopic scene based on mapping may be implemented into the disclosed system for realizing a virtual stereoscopic scene based on mapping. As shown in FIG. 7, the system may include a single camera 81, a parameter collector 82, and a smart terminal 83. Other components may be added and certain components may be removed without departing from the principles of the disclosed embodiments.

The parameter collector 82 may be configured to collect or acquire a distance between the single camera 81 and a virtual near clipping plane (denoted as N_V), and a distance between the single camera 81 and a virtual far clipping plane (denoted as F_V) in a virtual scene. The parameter collector 82 may be an infrared scanner, a tellurometer, and a manual input device receiving manually input parameters, etc.

The single camera 81 may be configured to record or capture scene content which is going to have a perspective projection transformation, and the scene may include at least one physical object.

The smart terminal 83 may be configured to obtain corresponding parameters for transforming the scene content captured by the single camera 81 into scene content of a left virtual camera and scene content of a right virtual camera in the virtual scene. The corresponding parameters for transforming the scene captured by the single camera 81 may include the distance between the single camera 81 and a virtual near clipping plane (denoted as N_V), and the distance between the single camera 81 and a virtual far clipping plane (denoted as F_V) in the virtual scene. Based on the obtained N_V and F_V, the smart terminal 83 may be configured to transform the scene content captured by the single camera 81 into scene content of the left virtual camera and scene content of the right virtual camera in the virtual scene.

The smart terminal 83 may also be configured to perform any disclosed methods for realizing a virtual stereoscopic scene based on mapping, which are not repeated here.

In the disclosed system for realizing a virtual stereoscopic scene based on mapping, the scene captured by the single camera 81 may be called as the virtual scene. That is, the virtual scene may be created by images of physical objects. Thus, the disclosed methods for realizing a virtual stereoscopic scene based on mapping may be applied to the virtual scene created by images of physical objects, through which a scene captured by the signal camera may be converted to a virtual stereoscopic scene.

In the disclosed system for realizing virtual stereoscopic scene based on mapping, given the virtual stereoscopic scene and the asymmetric perspective projection parameters of the left virtual camera and the right virtual camera, the disclosed system may be able to directly and rapidly project the virtual stereoscopic scene to the real scene. The corresponding 3D effect may be adjusted according to various settings determined by uses and developers.

In one embodiment, the smart terminal 83 in the disclosed system for realizing virtual stereoscopic scene based on mapping may be a smart terminal shown in FIG. 6. That is, referring to FIG. 6 and FIG. 7, the system may include the single camera 81, the parameter collector 82, and the smart terminal 83, and the smart terminal 83 may further include the display 70, the memory 71, the parameter input unit 72, and the processor 73. The functions of display 70, the memory 71, the parameter input unit 72, and the processor 73 have been explained in FIG. 6, thus, are not repeated here. In particular, the parameter collector 81 may collect various distance data for realizing virtual stereoscopic scene based on mapping, and the parameter input unit 72 may acquire the various distance data from the parameter collector 81.

The present disclosure provides a method, an apparatus and a system for realizing virtual stereoscopic scene based on mapping. Provided that a ratio between the parallax in the real scene at the distance N_R (denoted as $d_{N\_R}$) and the parallax in the real scene at the distance F_R (denoted as $d_{F\_R}$) is the same as a ratio between the parallax in the virtual scene at the distance N_V (denoted as $d_{N\_V}$) and the parallax in the virtual scene at the distance F_V (denoted as $d_{F\_V}$), i.e., $d_{N\_R}/d_{F\_R}=d_{N\_V}/d_{F\_V}$, the distance between the left virtual camera and the right virtual camera (denoted as E_V), as well as, asymmetric perspective projection parameters of the left virtual camera and the right virtual camera may be obtained.

Based on the calculated distance E_V and the asymmetric perspective projection parameters, the virtual stereoscopic scene of the virtual scene may be created. That is, the virtual scene between N_V (i.e., the distance between the virtual single camera and the virtual near clipping plane) and F_V (i.e., the distance between the virtual single camera and the virtual far clipping plane) may be projected to the real scene between N_R (i.e., the maximum convex displaying distance of the real screen) and F_R (i.e., the maximum concave displaying distance of the real screen). A desired fusion between the virtual stereoscopic scene and the real observation space may be realized, the generated 3D effect may be improved and the user experience may be enhanced accordingly.

Further, the disclosed method, apparatus and system for realizing a virtual stereoscopic scene based on mapping may be simple and easy to be developed. Through combining the virtual scene corresponding to the stereoscopic scene to be created, the asymmetric perspective projection parameters of the left virtual camera and the right virtual camera, and corresponding stereoscopic hardware devices, the virtual scene may be directly and rapidly projected to the real scene. Thus, the stereoscopic virtual scene may be presented in the real scene, and the corresponding 3D effect may be adjusted according to various settings determined by uses and developers. The stereoscopic hardware devices may include 3D projectors, 3D TVs, virtual reality (VR) helmets, and augmented reality (AR) eyewear, etc.

The disclosed method, apparatus, system and smart terminal for realizing a virtual stereoscopic scene based on mapping may be realized according to the same concept, which may provide support to develop apparatus and smart terminal capable of performing the corresponding method.

Those skilled in the art would further appreciate that the various illustrative units and algorithm steps disclosed in the embodiments may be implemented as electronic hardware, computer software, or combinations of both. To clearly illustrate this interchangeability of hardware and software, various illustrative units and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The steps of a method or algorithm disclosed in the embodiments may be embodied directly in hardware, in a software unit executed by a processor, or in a combination of the two. A software unit may reside in RAM, flash memory, ROM, EPROM (erasable programmable read-only memory), EEPROM (electrically erasable programmable read-only memory), registers, hard disk, a removable disk, a CD-ROM, or any other form of storage medium known in the art.

The description of the disclosed embodiments is provided to illustrate the present invention to those skilled in the art. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:
1. A method for realizing a virtual stereoscopic scene based on mapping, comprising:
in a real scene, acquiring a distance between an observer's two eyes E_R, a maximum convex displaying distance of a real screen N_R, a distance from the observer's eyes to the real screen Z_R, and a maximum concave displaying distance of the real screen F_R;

based on the obtained E_R, N_R, Z_R and F_R, calculating a parallax $d_{N\_R}$ in the real scene at the distance N_R, and a parallax $d_{F\_R}$ in the real scene at the distance F_R;

in a virtual scene, acquiring a distance between a virtual single camera and a virtual near clipping plane N_V, and a distance between a virtual single camera and a virtual far clipping plane F_V;

based on a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, the parallax $d_{N\_V}$, $d_{F\_V}$, and the distance N_V and F_V, calculating a distance E_V between a left virtual camera and a right virtual camera, and asymmetric perspective projection parameters of the left virtual camera and the right virtual camera;

based on the distance E_V and the virtual single camera, obtaining the left virtual camera and the right virtual camera; and based on the left virtual camera, the right virtual camera, and the asymmetric perspective projection parameters of the right and left virtual cameras, performing a perspective projection transformation of scene content between the virtual near clipping plane and the virtual far clipping plane of the virtual single camera to a virtual stereoscopic scene between the maximum convex displaying distance of a real screen N_R and the maximum concave displaying distance of the real screen F_R, creating and displaying the virtual stereoscopic scene corresponding to the virtual scene, such that a mapping between the virtual scene and the real scene is generated.

2. The method for realizing a virtual stereoscopic scene based on mapping according to claim 1, wherein based on the obtained E_R, N_R, Z_R and F_R, calculating a parallax $d_{N\_R}$ in the real scene at the distance N_R, and a parallax $d_{F\_R}$ in the real scene at the distance F_R further includes:

based on a principle that the ratios of the lengths of their corresponding sides are equal when two figures are similar, obtaining equations $$d_{N\_R} = \frac{N\_R * E\_R}{Z\_R - N\_R} \text{ and } d_{F\_R} = \frac{F\_R * E\_R}{Z\_R + F\_R};$$

and based on the distance E_R, N_R, Z_R and F_R, calculating the parallax $d_{N\_R}$ and $d_{F\_R}$.

3. The method for realizing a virtual stereoscopic scene based on mapping according to claim 2, wherein provided that a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, based on the parallax $d_{N\_V}$, $d_{F\_V}$, and the distance N_V and F_V, calculating a distance E_V between a left virtual camera and a right virtual camera, and asymmetric perspective projection parameters of the left virtual camera and the right virtual camera further includes:

based on a principle that a ratio between the parallax $d_{N\_R}$ and the parallax $d_{F\_R}$ is the same as a ratio between the parallax $d_{N\_V}$ in the virtual scene at the distance N_V and the parallax $d_{F\_V}$ in the virtual scene at the distance F_V, calculating a distance Z_V between the left/right virtual camera and a virtual zero parallax plane;

based on a viewing angle θ between the virtual single camera and the virtual zero parallax plane as well as the distance Z_V, calculating a width of the virtual screen W_con;

based on the width of the virtual screen W_con and a width of the real screen W_R, calculating a scale factor φ between the width of the virtual screen W_con and the width of the real screen W_R;

based on the scale factor φ and an equation for calculating the distance between the left virtual camera and the right virtual camera, calculating the distance E_V between the left virtual camera and the right virtual camera; and based on the distance E_V and Z_V, calculating the asymmetric perspective projection parameters of the left virtual camera and the right virtual camera, wherein the equation for calculating the distance between the left virtual camera and the right virtual camera is $$E\_V = \frac{\varphi * d_{N\_R} * N\_V}{Z\_V - N\_V} \text{ or } E\_V = \frac{\varphi * d_{F\_R} * F\_V}{F\_V - Z\_V}.$$

4. The method for realizing a virtual stereoscopic scene based on mapping according to claim 3, wherein based on a principle that a ratio between the parallax $d_{N\_R}$ and the parallax $d_{F\_R}$ is the same as a ratio between the parallax $d_{N\_V}$ in the virtual scene at the distance N_V and the parallax $d_{F\_V}$ in the virtual scene at the distance F_V, calculating a distance Z_V between the left/right virtual camera and a virtual zero parallax plane further includes:

according to the principle that the ratio between the parallax $d_{N\_R}$ and the parallax $d_{F\_R}$ is the same as the ratio between the parallax $d_{N\_V}$ in the virtual scene at the distance N_V and the parallax $d_{F\_V}$ in the virtual scene at the distance F_V, obtaining $$Z\_V = \frac{R+1}{\frac{1}{N\_V} + \frac{R}{F\_V}},$$

where R denotes the ratio between the parallax $d_{N\_R}$ and the parallax $d_{F\_R}$, $R = d_{N\_R}/d_{F\_R}$.

5. The method for realizing a virtual stereoscopic scene based on mapping according to claim 4, wherein:

the asymmetric perspective projection parameters of the left virtual camera are $$\begin{cases} l_{left} = -\frac{W\_V}{2} + \frac{E\_V}{2} * N\_V/Z\_V \\ r_{left} = \frac{W\_V}{2} + \frac{E\_V}{2} * N\_V/Z\_V \\ t_{left} = \frac{H\_V}{2} \\ b_{left} = -\frac{H\_V}{2} \\ n_{left} = N\_V \\ f_{left} = F\_V \end{cases};$$

and the asymmetric perspective projection parameters of the right virtual camera are $$\begin{cases} l_{right} = -\dfrac{W\_V}{2} - \dfrac{E\_V}{2}*N\_V/Z\_V \\ r_{right} = \dfrac{W\_V}{2} - \dfrac{E\_V}{2}*N\_V/Z\_V \\ t_{right} = \dfrac{H\_V}{2} \\ b_{right} = -\dfrac{H\_V}{2} \\ n_{right} = N\_V \\ f_{right} = F\_V \end{cases},$$

wherein $L_{left}$, $r_{left}$, $t_{left}$ and $b_{left}$ respectively denote coordinates of an upper boundary, a lower boundary, a left boundary, and a right boundary of the asymmetric perspective projection of the left virtual camera; $n_{left}$ denotes a distance between the left virtual camera and the virtual near clipping plane in the asymmetric perspective projection parameters of the left virtual camera, and $f_{left}$ to denotes a distance between the left virtual camera and the virtual far clipping plane in the asymmetric perspective projection parameters of the left virtual camera, $L_{right}$, $r_{right}$, $t_{right}$ and $b_{right}$ respectively denote coordinates of an upper boundary, a lower boundary, a right boundary, and a right boundary of the asymmetric perspective projection of the right virtual camera; $n_{right}$ denotes a distance between the right virtual camera and the virtual near clipping plane in the asymmetric perspective projection parameters of the right virtual camera, and $f_{right}$ denotes a distance between the right virtual camera and the virtual far clipping plane in the asymmetric perspective projection parameters of the right virtual camera; and W_V denotes a width of the virtual near clipping plane of the virtual scene, and H_V denotes a height of the virtual near clipping plane of the virtual scene.

6. The method for realizing a virtual stereoscopic scene based on mapping according to claim 5, wherein based on the left virtual camera, the right virtual camera, and the asymmetric perspective projection parameters of the right and left virtual cameras, performing a perspective projection transformation of scene content of the virtual single camera, creating and displaying a virtual stereoscopic scene corresponding to the virtual scene further includes:

performing a perspective projection transformation of scene of the left virtual camera through multiplying coordinates of stereoscopic scene captured by the left virtual camera by a left perspective projection matrix M1, where M1 is expressed as:

$$M_1 = \begin{pmatrix} \dfrac{2n_{left}}{r_{left} - l_{left}} & 0 & \dfrac{r_{left} + l_{left}}{r_{left} - l_{left}} & 0 \\ 0 & \dfrac{2n_{left}}{t_{left} - b_{left}} & \dfrac{t_{left} + b_{left}}{t_{left} - b_{left}} & 0 \\ 0 & 0 & -\dfrac{f_{left} + n_{left}}{f_{left} - n_{left}} & \dfrac{2f_{left}*n_{left}}{f_{left} - n_{left}} \\ 0 & 0 & -1 & 0 \end{pmatrix},$$

and performing a perspective projection transformation of scene of the right virtual camera through multiplying coordinates of stereoscopic scene captured by the right virtual camera by a right perspective projection matrix M2, where M2 is expressed as:

$$M_2 = \begin{pmatrix} \dfrac{2n_{right}}{r_{right} - l_{right}} & 0 & \dfrac{r_{right} + l_{right}}{r_{right} - l_{right}} & 0 \\ 0 & \dfrac{2n_{right}}{t_{right} - b_{right}} & \dfrac{t_{right} + b_{right}}{t_{right} - b_{right}} & 0 \\ 0 & 0 & -\dfrac{f_{right} + n_{right}}{f_{right} - n_{right}} & \dfrac{2f_{right}*n_{right}}{f_{right} - n_{right}} \\ 0 & 0 & -1 & 0 \end{pmatrix}.$$

7. The method for realizing a virtual stereoscopic scene based on mapping according to claim 1, wherein in a virtual scene, acquiring a distance between a virtual single camera and a virtual near clipping plane N_V, and a distance between a virtual single camera and a virtual far clipping plane F_V further includes:

obtaining a distance from the virtual single camera to a closet object in the virtual scene N_O and a distance from the virtual single camera to a furthest object in the virtual scene F_O; and assigning the distance N_O to the distance N_V, and the distance F_O to the distance F_V.

8. The method for realizing a virtual stereoscopic scene based on mapping according to claim 1 is applied to a theater having a left projector and a right projector, wherein:

scene content of the left virtual camera obtained from the perspective projection transformation is provided to the left projector, and scene content of the right virtual camera obtained from the perspective projection transformation is provided to the right projector.

9. The method for realizing a virtual stereoscopic scene based on mapping according to claim 1 is applied to a virtual reality (VR) helmet having a left display screen and a right display screen, wherein:

scene content of the left virtual camera obtained from the perspective projection transformation is provided to the left display screen, and scene content of the right virtual camera obtained from the perspective projection transformation is provided to the right display screen.

10. The method for realizing a virtual stereoscopic scene based on mapping according to claim 1 is applied to augmented reality (AR) eyewear which has a left display lens and a right display lens, wherein:

scene content of the left virtual camera obtained from the perspective projection transformation is provided to the left display lens, and scene content of the right virtual camera obtained from the perspective projection transformation is provided to the right display lens.

11. A system for realizing a virtual stereoscopic scene based on mapping, comprising:

a memory storing instructions; and a processor coupled to the memory and, when executing the instructions, configured to:

in a real scene, acquire a distance between an observer's two eyes E_R, a maximum convex displaying distance of a real screen N_R, a distance from the observer's eyes to the real screen Z_R, and a maximum concave displaying distance of the real screen F_R, and configured to, in a virtual scene, acquire a distance between a virtual single camera and a virtual near clipping plane N_V, and a distance between a virtual single camera and a virtual far clipping plane F_V;

based on the obtained E_R, N_R, Z_R and F_R, calculating a parallax $d_{N\_R}$ in the real scene at the distance N_R, and a parallax $d_{F\_R}$ in the real scene at the distance F_R, and a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, based on the parallax $d_{N\_V}$, $d_{F\_V}$, and the distance N_V and F_V, calculate a distance E_V between a left virtual camera and a right virtual camera, and asymmetric perspective projection parameters of the left virtual camera and the right virtual camera; and based on the distance E_V and the virtual single camera, obtain the left virtual camera and the right virtual camera, and based on the left virtual camera, the right virtual camera, and the asymmetric perspective projection parameters of the right and left virtual cameras, configured to perform a perspective projection transformation of scene content between the virtual near clipping plane and the virtual far clipping plane of the virtual single camera to the virtual stereoscopic scene between the maximum convex displaying distance of a real screen N_R and the maximum concave displaying distance of the real screen F_R, creating and displaying the virtual stereoscopic scene corresponding to the virtual scene, such that a mapping between the virtual scene and the real scene is generated.

12. The system for realizing a virtual stereoscopic scene based on mapping according to claim 11, wherein the processor is further configured to:

based on a principle that the ratios of the lengths of their corresponding sides are equal when two figures are similar, obtain equations $$d_{N\_R} = \frac{N\_R * E\_R}{Z\_R - N\_R} \text{ and } d_{F\_R} = \frac{F\_R * E\_R}{Z\_R + F\_R},$$

and based on the distance E_R, N_R, Z_R and F_R, calculate the parallax $d_{N\_R}$ and $d_{F\_R}$;

based on a principle that a ratio between the parallax $d_{N\_R}$ and the parallax $d_{F\_R}$ is the same as a ratio between the parallax $d_{N\_V}$ in the virtual scene at the distance N_V and the parallax $d_{F\_V}$ in the virtual scene at the distance F_V, calculate a distance Z_V between the left/right virtual camera and a virtual zero parallax plane, based on a viewing angle θ between the virtual single camera and the virtual zero parallax plane as well as the distance Z_V, calculate a width of the virtual screen W_con;

based on the width of the virtual screen W_con and a width of the real screen W_R, calculate a scale factor φ between the width of the virtual screen W_con and the width of the real screen W_R, based on the scale factor φ and an equation for calculating the distance between the left virtual camera and the right virtual camera, calculate the distance E_V between the left virtual camera and the right virtual camera, and based on the distance E_V and Z_V, calculate the asymmetric perspective projection parameters of the left virtual camera and the right virtual camera, wherein the equation for calculating the distance between the left virtual camera and the right virtual camera is $$E\_V = \frac{\varphi * d_{N\_R} * N\_V}{Z\_V - N\_V} \text{ or } E\_V = \frac{\varphi * d_{F\_R} * F\_V}{F\_V - Z\_V}.$$

13. The system for realizing a virtual stereoscopic scene based on mapping according to claim 12, wherein the processor is further configured to:

according to the principle that the ratio between the parallax $d_{N\_R}$ and the parallax $d_{F\_R}$ is the same as the ratio between the parallax $d_{N\_V}$ in the virtual scene at the distance N_V and the parallax $d_{F\_V}$ in the virtual scene at the distance F_V, obtain $Z\_V = \dfrac{R+1}{\dfrac{1}{N\_V} + \dfrac{R}{F\_V}}$, where R denotes the ratio between the parallax $d_{N\_R}$ and the parallax $d_{F\_R}$, and $R = d_{N\_R}/d_{F\_R}$.

14. The system for realizing a virtual stereoscopic scene based on mapping according to claim 13, wherein:

the asymmetric perspective projection parameters of the left virtual camera are $$\begin{cases} l_{left} = -\dfrac{W\_V}{2} + \dfrac{E\_V}{2} * N\_V/Z\_V \\ r_{left} = \dfrac{W\_V}{2} + \dfrac{E\_V}{2} * N\_V/Z\_V \\ t_{left} = \dfrac{H\_V}{2} \\ b_{left} = -\dfrac{H\_V}{2} \\ n_{left} = N\_V \\ f_{left} = F\_V \end{cases};$$

and the asymmetric perspective projection parameters of the right virtual camera are $$\begin{cases} l_{right} = -\dfrac{W\_V}{2} - \dfrac{E\_V}{2} * N\_V/Z\_V \\ r_{right} = \dfrac{W\_V}{2} - \dfrac{E\_V}{2} * N\_V/Z\_V \\ t_{right} = \dfrac{H\_V}{2} \\ b_{right} = -\dfrac{H\_V}{2} \\ n_{right} = N\_V \\ f_{right} = F\_V \end{cases},$$

wherein $L_{left}$, $r_{left}$, $t_{left}$ and $b_{left}$ respectively denote coordinates of an upper boundary, a lower boundary, a left boundary, and a right boundary of the asymmetric perspective projection of the left virtual camera;

$n_{left}$ denotes a distance between the left virtual camera and the virtual near clipping plane in the asymmetric perspective projection parameters of the left virtual camera, and $f_{left}$ denotes a distance between the left virtual camera and the virtual far clipping plane in the asymmetric perspective projection parameters of the left virtual camera, $L_{right}$, $r_{right}$, $t_{right}$ and $b_{right}$ respectively denote coordinates of an upper boundary, a lower boundary, a right boundary, and a right boundary of the asymmetric perspective projection of the right virtual camera;

$n_{right}$ denotes a distance between the right virtual camera and the virtual near clipping plane in the asymmetric perspective projection parameters of the right virtual camera, and $f_{right}$ denotes a distance between the right virtual camera and the virtual far clipping plane in the asymmetric perspective projection parameters of the right virtual camera; and W_V denotes a width of the virtual near clipping plane of the virtual scene, and H_V denotes a height of the virtual near clipping plane of the virtual scene.

15. The system for realizing a virtual stereoscopic scene based on mapping according to claim 14, wherein the processor is further configured to:

perform a perspective projection transformation of scene of the left virtual camera through multiplying coordinates of stereoscopic scene captured by the left virtual camera by a left perspective projection matrix M1, where M1 is expressed as:

$$M_1 = \begin{pmatrix} \frac{2n_{left}}{r_{left}-l_{left}} & 0 & \frac{r_{left}+l_{left}}{r_{left}-l_{left}} & 0 \\ 0 & \frac{2n_{left}}{t_{left}-b_{left}} & \frac{t_{left}+b_{left}}{t_{left}-b_{left}} & 0 \\ 0 & 0 & -\frac{f_{left}+n_{left}}{f_{left}-n_{left}} & \frac{2f_{left}*n_{left}}{f_{left}-n_{left}} \\ 0 & 0 & -1 & 0 \end{pmatrix},$$

and perform a perspective projection transformation of scene of the right virtual camera through multiplying coordinates of stereoscopic scene captured by the right virtual camera by a right perspective projection matrix M2, where M2 is expressed as:

$$M_2 = \begin{pmatrix} \frac{2n_{right}}{r_{right}-l_{right}} & 0 & \frac{r_{right}+l_{right}}{r_{right}-l_{right}} & 0 \\ 0 & \frac{2n_{right}}{t_{right}-b_{right}} & \frac{t_{right}+b_{right}}{t_{right}-b_{right}} & 0 \\ 0 & 0 & -\frac{f_{right}+n_{right}}{f_{right}-n_{right}} & \frac{2f_{right}*n_{right}}{f_{right}-n_{right}} \\ 0 & 0 & -1 & 0 \end{pmatrix}.$$

16. The system for realizing a virtual stereoscopic scene based on mapping according to claim 11, wherein the processor is further configured to:

obtain a distance from the virtual single camera to a closet object in the virtual scene N_O and a distance from the virtual single camera to a furthest object in the virtual scene F_O; and assign the distance N_O to the distance N_V, and the distance F_O to the distance F_V.

17. A system for realizing a virtual stereoscopic scene based on mapping, comprising:

a single camera, a parameter collector, and a smart terminal, wherein the single camera and the parameter collector are connected to the smart terminal, respectively;

the parameter collector is configured to, in a real scene, collect a distance between an observer's two eyes E_R, a maximum convex displaying distance of a real screen N_R, a distance from the observer's eyes to the real screen Z_R, and a maximum concave displaying distance of the real screen F_R, and in a virtual scene, collect a distance between a virtual single camera and a virtual near clipping plane N_V, and a distance between a virtual single camera and a virtual far clipping plane F_V;

the single camera is configured to capture sense content going to have a perspective projection transformation;

the smart terminal is configured to, acquire corresponding parameters for the perspective projection transformation of the sense content between the virtual near clipping plane and the virtual far clipping plane captured by the single camera to the virtual stereoscopic scene between the maximum convex displaying distance of a real screen N_R and the maximum concave displaying distance of the real screen F_R, wherein the corresponding parameters include the distance E_R, N_R, Z_R and F_R, based on the distance E_R, N_R, Z_R and F_R, calculate a parallax $d_{N\_R}$ in the real scene at the distance N_R, and a parallax $d_{F\_R}$ in the real scene at the distance F_R, and based on a ratio between the parallax $d_{N\_R}$ and the parallax $d_{F\_R}$ is the same as a ratio between a parallax $d_{N\_V}$ in the virtual scene at the distance N_V and a parallax $d_{F\_V}$ in the virtual scene at the distance F_V, transform the scene content captured by the single camera into scene content of a left virtual camera and scene content of a right virtual camera in the virtual scene.

18. The system for realizing a virtual stereoscopic scene based on mapping according to claim 17, wherein the smart terminal further comprising:

a display, a memory, and a processor, wherein the display and the memory are connected to the processor respectively, wherein the processor is configured to, in the real scene, acquire the distance between an observer's two eyes E_R, the maximum convex displaying distance of a real screen N_R, the distance from the observer's eyes to the real screen Z_R, and the maximum concave displaying distance of the real screen F_R, and save in the memory, and in the virtual scene, acquire the distance between a virtual single camera and the virtual near clipping plane N_V, and the distance between a virtual single camera and the virtual far clipping plane F_V, and save in the memory; and the processor is configured to, based on the obtained distance E_R, N_R, Z_R and F_R, calculate the parallax $d_{N\_R}$ in the real scene at the distance N_R, and the parallax $d_{F\_R}$ in the real scene at the distance F_R, provided that the ratio between the parallax $d_{N\_R}$ and the parallax $d_{F\_R}$ is the same as the ratio between the parallax $d_{N\_V}$ and the parallax $d_{F\_V}$, based on the parallax $d_{N\_V}$, $d_{F\_V}$, and the distance N_V and F_V, calculate a distance E_V between the left virtual camera and the right virtual camera, and asymmetric perspective projection parameters of the left virtual camera and the right virtual camera, based on the distance E_V and the virtual single camera, obtain the left virtual camera and the right virtual camera, and based on the left virtual camera, the right virtual camera, and the asymmetric perspective projection parameters of the right and left virtual cameras, perform a perspective projection transformation of scene content of the virtual single camera, create and display a virtual stereoscopic scene corresponding to the virtual scene on the display, such that a mapping between the virtual scene and the real scene is generated.

19. The system for realizing a virtual stereoscopic scene based on mapping according to claim 18, wherein:

the asymmetric perspective projection parameters of the left virtual camera are $$\begin{cases} l_{left} = -\dfrac{W\_V}{2} + \dfrac{E\_V}{2} * N\_V / Z\_V \\ r_{left} = \dfrac{W\_V}{2} + \dfrac{E\_V}{2} * N\_V / Z\_V \\ t_{left} = \dfrac{H\_V}{2} \\ b_{left} = -\dfrac{H\_V}{2} \\ n_{left} = N\_V \\ f_{left} = F\_V \end{cases} ;$$

and the asymmetric perspective projection parameters of the right virtual camera are $$\begin{cases} l_{right} = -\dfrac{W\_V}{2} - \dfrac{E\_V}{2} * N\_V / Z\_V \\ r_{right} = \dfrac{W\_V}{2} - \dfrac{E\_V}{2} * N\_V / Z\_V \\ t_{right} = \dfrac{H\_V}{2} \\ b_{right} = -\dfrac{H\_V}{2} \\ n_{right} = N\_V \\ f_{right} = F\_V \end{cases} ,$$

Wherein $L_{left}$, $r_{left}$, $t_{left}$ and $b_{left}$ respectively denote coordinates of an upper boundary, a lower boundary, a left boundary, and a right boundary of the asymmetric perspective projection of the left virtual camera; $n_{left}$ denotes a distance between the left virtual camera and the virtual near clipping plane in the asymmetric perspective projection parameters of the left virtual camera, and $f_{left}$ to denotes a distance between the left virtual camera and the virtual far clipping plane in the asymmetric perspective projection parameters of the left virtual camera, $L_{right}$, $r_{right}$, $t_{right}$ and $b_{right}$ respectively denote coordinates of an upper boundary, a lower boundary, a right boundary, and a right boundary of the asymmetric perspective projection of the right virtual camera; $n_{right}$ denotes a distance between the right virtual camera and the virtual near clipping plane in the asymmetric perspective projection parameters of the right virtual camera, and $f_{right}$ denotes a distance between the right virtual camera and the virtual far clipping plane in the asymmetric perspective projection parameters of the right virtual camera; and W_V denotes a width of the virtual near clipping plane of the virtual scene, and H_V denotes a height of the virtual near clipping plane of the virtual scene.

20. The system for realizing a virtual stereoscopic scene based on mapping according to claim 19, wherein:

the processor is further configured to perform the perspective projection transformation of scene of the left virtual camera through multiplying coordinates of stereoscopic scene captured by the left virtual camera by a left perspective projection matrix M1, where M1 is expressed as:

$$M_1 = \begin{pmatrix} \dfrac{2n_{left}}{r_{left} - l_{left}} & 0 & \dfrac{r_{left} + l_{left}}{r_{left} - l_{left}} & 0 \\ 0 & \dfrac{2n_{left}}{t_{left} - b_{left}} & \dfrac{t_{left} + b_{left}}{t_{left} - b_{left}} & 0 \\ 0 & 0 & -\dfrac{f_{left} + n_{left}}{f_{left} - n_{left}} & \dfrac{2f_{left} * n_{left}}{f_{left} - n_{left}} \\ 0 & 0 & -1 & 0 \end{pmatrix},$$

and perform the perspective projection transformation of scene of the right virtual camera through multiplying coordinates of stereoscopic scene captured by the right virtual camera by a right perspective projection matrix M2, where M2 is expressed as:

$$M_2 = \begin{pmatrix} \dfrac{2n_{right}}{r_{right} - l_{right}} & 0 & \dfrac{r_{right} + l_{right}}{r_{right} - l_{right}} & 0 \\ 0 & \dfrac{2n_{right}}{t_{right} - b_{right}} & \dfrac{t_{right} + b_{right}}{t_{right} - b_{right}} & 0 \\ 0 & 0 & -\dfrac{f_{right} + n_{right}}{f_{right} - n_{right}} & \dfrac{2f_{right} * n_{right}}{f_{right} - n_{right}} \\ 0 & 0 & -1 & 0 \end{pmatrix}.$$

* * * * *